(12) United States Patent
Ikeda et al.

(10) Patent No.: US 8,449,333 B2
(45) Date of Patent: May 28, 2013

(54) BATTERY CONNECTING STRUCTURE

(75) Inventors: Tomohiro Ikeda, Makinohara (JP); Shigeyuki Ogasawara, Makinohara (JP); Tomochika Inoue, Makinohara (JP); Shinichi Yanagihara, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/379,722

(22) PCT Filed: Oct. 1, 2010

(86) PCT No.: PCT/JP2010/067239
§ 371 (c)(1),
(2), (4) Date: Dec. 21, 2011

(87) PCT Pub. No.: WO2011/043261
PCT Pub. Date: Apr. 14, 2011

(65) Prior Publication Data
US 2012/0231640 A1   Sep. 13, 2012

(30) Foreign Application Priority Data
Oct. 6, 2009   (JP) ................... 2009-232668

(51) Int. Cl.
*H01R 24/00*   (2006.01)
(52) U.S. Cl.
USPC ..................................................... 439/627
(58) Field of Classification Search
USPC .................................. 439/627, 500
See application file for complete search history.

(56) References Cited

U.S. PATENT DOCUMENTS

| 6,168,470 | B1 * | 1/2001 | Ikeda et al. | 439/620.08 |
| 7,077,704 | B2 * | 7/2006 | Ikeda et al. | 439/627 |

(Continued)

FOREIGN PATENT DOCUMENTS

| JP | 2006-269103 A | 10/2006 |
| JP | 2006-269104 A | 10/2006 |
| JP | 2009-043637 A | 2/2009 |
| JP | 2009-212005 A | 9/2009 |

OTHER PUBLICATIONS

International Search Report and Written Opinion for PCT/JP2010/067239 issued Dec. 7, 2010.

*Primary Examiner* — Gary F. Paumen
(74) *Attorney, Agent, or Firm* — Edwards Wildman Palmer LLP

(57) ABSTRACT

The present invention is to provide a battery connecting structure to prevent a joint between a terminal and an electric wire from getting wet with water. The battery connecting structure includes a plurality of bus bars connecting a plurality of batteries in series by connecting a positive electrode and a negative electrode of the adjacent battery, said batteries overlapped with each other in a manner that the positive electrode and the negative electrode are arranged in the straight line alternately; a plurality of terminals respectively overlapped with each bus bar; a plurality of electric wires respectively connected with each terminal; and a plate receiving them. The plate includes a plurality of first receiving portion for receiving each bus bar and each terminal overlapped with the bus bar, a second receiving portion for receiving the electric wires connected to each terminal, and a plurality of third receiving portion for leading each electric wire connected to each terminal from each first receiving portion to the second receiving portion. Further, a bus bar connecting and a wire connecting portions of each terminal are received in each first receiving portion.

20 Claims, 15 Drawing Sheets

U.S. PATENT DOCUMENTS 7,229,320 B2 * 6/2007 Saito et al. .................... 439/627
7,604,507 B1 * 10/2009 Millon .......................... 439/627
7,638,237 B2 * 12/2009 Ha et al. ........................ 429/152
2004/0043663 A1 * 3/2004 Ikeda et al. ................... 439/627

* cited by examiner

BATTERY CONNECTING STRUCTURE

The priority application Number Japan Patent Application No. 2010-067239 upon which this patent application is based is hereby incorporated by reference.

BACKGROUND OF THE INVENTION

1. Field of the Invention

The present invention relates to a battery connecting structure included in a power supply device used in a hybrid vehicle, an electric vehicle and the like.

2. Description of the Related Art

Conventionally, in an electric vehicle running by using an electric motor and a hybrid vehicle running by using both an engine and electric motor, the above power supply device is mounted as a drive source of the electric motor. For example, the power-supply device has a battery assembly and a pair of battery connecting structures (see patent document 1). The battery assembly is constructed by alternately inversely overlapping a plurality of batteries with each other. In one side of the battery, a positive electrode is provided, and in the other side thereof, a negative electrode is provided. The pair of battery connecting structures are attached to one side of the battery assembly and the other side thereof respectively. Further, FIG. 17 is a plan view showing a part of a conventional battery connecting structure.

The battery connecting structure 202 shown in FIG. 17 has a plurality of bus bars 203, a plurality of terminals 204, a plurality of electric wires 205 and a plate 206. The bus bar 203 connects a plurality of electric wires in series by connecting the positive electrode of the battery next to each other of the battery assembly and the negative electrode thereof. The terminals 204 are connected with each of the bus bar 203, and detect voltage of the battery. The electric wires 205 are connected with each of the terminal 204 respectively. The bus bar 203, the terminal 204 and the electric wire 205 are received in the plate 206 which is made of synthetic resin. Furthermore, the battery is provided with a cylindrical positive electrode projecting from one side of a box case, and a cylindrical negative electrode projecting from the other side thereof.

An arrow X in FIG. 17 shows an overlapping direction of the plurality of batteries and a longitudinal direction of the battery assembly. Also, an arrow Y in FIG. 17 shows a height direction of each the battery (namely, a height direction of the battery assembly). The battery assembly is mounted on a vehicle in a direction which the height direction (arrow Y direction) is in parallel to a gravitational direction. In other words, in a condition that the battery assembly is mounted on the vehicle, the above described positive electrode and negative electrodes project from a side of each battery in a horizontal direction.

The above bus bar 203 is formed into a plate shape by metal plate, and has a pair of bus bar holes 203a. In the pair of the bus bar holes 203a, the positive and negative electrodes of the battery arranged adjacent to each other are inserted. In the bus bar 203, the positive and negative electrodes of the adjacent battery are electrically connected by inserting the positive and negative electrodes of the battery adjacent to each other into the pair of the bus bar holes 203a.

The above terminal 204 is made by pressing a metal plate. In the terminal 204, a bus bar connecting portion 241 connected with the bus bar 203 and a wire connecting portion 242 connected with the electric wire 205 are provided together. The bus bar connecting portion 241 is formed in a plate shape, and has a terminal hole 241a. In the terminal hole 241a, one of the positive electrode or the negative electrode is inserted. The bus bar connecting portion 241 is overlapped with the bus bar 203 and connected thereto in a condition that one of the positive electrode or the negative electrode is inserted into the terminal hole 241a. The wire connecting portion 242 has a pair of crimping pieces 243 which are electrically connected to a core wire of the electric wire 205 by pressing the core wire thereof. Further, the electric wire 205 is connected to a voltage detecting circuit (not shown).

The above plate 206 integrally includes a plurality of bus bar receiving portions 261, an electric wire receiving portion 262 and a plurality of wire connection receiving portions 263. The bus bar receiving portion 261 is formed in a box shape which the bus bar 203 can be inserted into, and receives each the bus bar 203 and the bus bar connecting portion 241 overlapped on the bus bar 203. In a bottom wall of the bus bar receiving portion 261, a pair of plate holes (not shown) which can insert the positive and negative electrodes of the battery respectively are provided. The electric wire receiving portion 262 is formed in a gutter shape, and receives the plurality of the electric wires 205 connected with the wire connecting portion 242. The wire connection receiving portion 263 is formed in a gutter shape communicating with each the bus bar receiving portion 261 and the electric wire receiving portion 262, and receives each the wire connecting portion 242 and an end of the electric wire 205 which is connected to the wire connecting portion 242. Moreover, the wire connection receiving portion 263 leads the electric wire 205 into the electric wire receiving portion 262.

In addition, the bus bar receiving portion 261 and the electric wire receiving portion 262 are arranged at intervals in parallel to each other. Each of the wire connection receiving portions 263 is arranged between each the bus bar receiving portion 261 and the electric wire receiving portion 262. In regard to such the above battery connecting structure 202, one of the positive electrode or the negative electrode which is inserted into the plate hole, the bus bar hole 203a and the terminal hole 241a, the wire connection receiving portion 263 and the electric wire receiving portion 262 are linearly arranged along a vertical direction (namely, the arrow Y direction).

The battery connecting structure 202 having the construction described above is assembled as below. First, the bus bar 203, the terminal 204, the plate 206 and others are separately produced. Further, the electric wire 205 is previously connected to the wire connecting portion 242 of the terminal 204. When the electric wire 205 and the wire connecting portion 242 are connected, first, the core wire is exposed by removing an insulating cover of the end portion of the electric wire 205. And, after the core wire is positioned between the pair of the crimping pieces 243, the pair of the crimping pieces 243 is crimped. Then, by crimping the pair of the crimping pieces 243, the core wire of the electric wire 205 is fixed in the wire connecting portion 242 by applying pressure. As a result, the wire connecting portion 242 and the electric wire 205 are connected.

Next, each the bus bar 203 is received in each the bus bar receiving portion 261 of the plate 206 so that the plate hole, not shown, and the bus bar hole 203a are overlapped. And then, each the bus bar connecting portion 241 is overlapped on each the bus bar 203 so that one of the pair of the bus bar holes 203a and the terminal hole 241a are overlapped, and is received in each the bus bar receiving portion 261. In this case, each the bus bar connecting portion 241 is overlapped on each the bus bar 203 so as to receive each the wire connecting portion 242 in each wire connection receiving portion 263. Thereafter, each the electric wire 205 is received in the electric wire receiving portion 262. The battery connecting structure 202 is assembled in this way.

Furthermore, the battery connecting structure 202 assembled by the above mentioned procedure is overlapped on a one side surface of the battery assembly or the other side surface. Then, a nut is screwed in the positive electrode and the negative electrode which are inserted into the plate hole, the bus bar hole 203a and the terminal hole 241a. Thereby, the battery connecting structure 202 is installed in the battery assembly.

[Patent Document] JP2006-269104

However, in the above mentioned battery connecting structure 202, there is a problem described below. More specifically, in the conventional battery connecting structure 202, the wire connecting portion 242 and the electric wire 205 which is connected with the wire connecting portion 242 are received in the wire connection receiving portion 263 smaller than the bus bar receiving portion 261 and the electric wire receiving portion 262 in width. Furthermore, density of the wire connection receiving portion 263 is high, in other words, a space in the wire connection receiving portion 263 is small. Thereby, water droplet which is occurred by condensation and so on flow from the electric wire receiving portion 262 into the wire connection receiving portion 263 through a surface of the electric wire 205 by capillary action. As a result, there is a problem such that the drop of water is easy to adhere to the wire connecting portion 242 and the core wire of the electric wire 205 which is connected with the wire connecting portion 242. Additionally, in the wire connection receiving portion 263, as previously mentioned, the density thereof become high. Thereby, it is difficult to discharge the water droplet collected in an inside thereof. For this reason, further, there is a problem such that the wire connecting portion 242 and the core wire of the electric wire 205 are at risk of being exposed to water for a long time.

Furthermore, in the conventional battery connecting structure 202, the positive electrode or the negative electrode which is inserted into the plate hole, the bus bar hole 203a and the terminal hole 241, the wire connection receiving portion 263 and the electric wire receiving portion 262 are arranged along the vertical direction(namely, the arrow Y direction). Thereby, the water droplet occurred by condensation and so on adheres to the positive electrode or the negative electrode, and the falling water droplet flows into the electric wire receiving portion 262 through the wire connection receiving portion 263. Therefore, there is a problem such that the water droplet is more likely to attach to the wire connecting portion 242 received in the wire connection receiving portion 263 and the core wire of the electric wire 205 connected with the wire connecting portion 242. In addition, it is undesirable that the water droplet adheres to the battery connecting structure because it causes rust and so on.

Besides, in the conventional battery connecting structure 202, the wire connecting portion 242 of the terminal 204 has the pair of the crimping pieces 243 which attaches the core wire of the electric wire 205 by pressure. Thereby, after connecting the wire connecting portion 242 and the electric wire 205, it is necessary to receive the terminal 204 and the electric wire 205 in the plate 206. As a result, the work receiving the terminal 204 and the electric wire 205 in the plate 206 may be a difficult work. For this reason, the work receiving the terminal 204 and the electric wire 205 in the plate 206 needs to perform by hand work. Therefore, costs may quite high.

Furthermore, in the conventional battery connecting structure 202, in order to reduce load of the wire connecting portion 242 occurred by rotating the terminal 204 around the terminal hole 241a when the nut is screwed on the positive electrode or the negative electrode which is inserted into the terminal hole 241a of the terminal 204, a projection 241b for stopping its rotation is provided in the terminal 204, and a projection receiving portion 261a which the projection 241b is inserted is provided in a side wall of the bus bar receiving portion 261. Thereby, even if the terminal 204 is rotated when screwing the nut, the rotation is controlled because the projection 241b abuts against an inner surface of the projection receiving portion 261a. As just described, in the conventional battery connecting structure 202, it is necessary to have the projection 241b for rotation stop and the projection receiving portion 261a. Therefore, size of the terminal 204 and the plate 206 is increased.

SUMMARY OF THE INVENTION

Objects To Be Solved

An object of the present invention is to provide a battery connecting structure configured to prevent a joint between a terminal and an electric wire from getting wet with water.

According to the present invention, the plate includes a plurality of first receiving portions respectively receiving each bus bar and each terminal overlapped with the bus bar, and arranged along an arranging direction of the batteries; second receiving portion extended along an arranging direction of the first receiving portions, spaced in parallel to the first receiving portions, and receiving the electric wires which are connected to each terminal; and a plurality of third receiving portions communicating with an inside of each first receiving portion and an inside of the second receiving portion, and leading each electric wire connected to each terminal from each first receiving portion to the second receiving portion respectively. Further, the terminal includes a plate-shaped bus bar connecting portion overlapped with the bus bar and a wire connecting portion connecting the electric wire, and the bus bar connecting portion and the wire connecting portion are received in the first receiving portion. Thereby, the density of the third receiving portion can be prevented from increasing because a joint between the wire connecting portion and the electric wire is not arranged in the third receiving portion of which the width is smaller than the first receiving portion and the second receiving portion in width. Therefore, the battery connecting structure of the present invention can prevent the water droplet from entering in the first receiving portion from the second receiving portion and the third receiving portion thought the surface of the electric wire by capillary action.

Preferably, the wire connecting portion is arranged above the positive and negative electrodes of the battery in a gravitational direction when the bus bars are connected to the batteries. Thereby, a joint between the wire connecting portion and the electric wire can be prevented from getting wet with the water droplet which attach to the positive electrode or the negative electrode and fall by one's own weight. Therefore, the battery connecting structure which can prevent the joint between the terminal and the electric wire from getting wet with water can be provided.

Preferably, the wire connecting portion is arranged in an end of the first receiving portion, said end located on a side away from the second receiving portion. Further, the third receiving portion communicates with the end of the first receiving portion, and communicates with the second receiving portion through a space between the first receiving portion and another first receiving portion adjacent to the first receiving portion. Thereby, since distance from the second receiving portion to the wire connecting portion is long, the battery connecting structure can prevent the water droplet occurred by the condensation and the like from entering into the first receiving portion from the second receiving portion and the third receiving portion through the surface of the electric wire. Thus, the battery connecting structure in which the joint between the terminal and the electric wire can be prevented from getting wet with the water can be provided.

Preferably, the first receiving portion is arranged above the second receiving portion and the third receiving portion in the gravitational direction when the bus bars are connected to the electric wires. Even if water is entered into the first receiving portion, the water is immediately discharged in the third and second receiving portions which are positioned below the first receiving portion in the gravitational direction. As a result, the joint between the wire connecting portion and the electric wire can be prevented from being exposed to the water for many hours. Thus, the battery connecting structure in which the joint between the terminal and the electric wire can be prevented from getting wet with the water can be provided.

Preferably, the wire connecting portion includes at least a pair of press-contact blades which penetrate an insulating cover of the electric wire and connected to the core wire of the electric wire when the electric wire is pressed between press-contact blades. Thereby, the work for receiving the terminal and the electric wire in the plate can be automated, and an assembling cost can be reduced.

Preferably, the bus bar connecting portion includes a terminal hole into which the positive electrode of the battery or the negative electrode thereof is inserted; and an opening into which a projection arranged in the plate is inserted for stopping rotation. Further, the wire connecting portion includes a press-contact blade which is formed by cutting and standing a part of the bus bar connecting portion and is connected to a core wire of the electric wire by penetrating the insulating cover of the electric wire. Further, the opening for stopping rotation is formed by cutting and standing the part of the bus bar connecting portion including the press-contact blade from the bus bar connecting portion. Thereby, the terminal can be prevented from rotating when a nut is screwed in the positive and negative electrodes of the battery. Moreover, the terminal can be miniaturized compared with a case that a projection for stopping the terminal is arranged. Therefore, the battery connecting structure can be miniaturized.

Preferably, the bus bar connecting portion includes a terminal hole for inserting the positive electrode of the battery or the negative electrode thereinto. Further, the wire connecting portion includes a bottom plate formed in a cantilever plate shape in which only one end of the bottom plate continues into the bus bar connecting portion and positioning the electric wire in a surface thereof; and a press-contact blade connected to the core wire of the electric wire by penetrating the insulating cover of the electric wire which is positioned on the surface of the bottom plate. Thereby, when the nut is screwed in the positive and negative electrodes of the battery and then the wire connecting portion hit on the plate by rotating the terminal, the press-contact blade can prevent stress from concentrating on it because a connection point between the bottom plate and the bus bar connecting portion is bent and the bottom plate is moved. Therefore, the press-contact blade can be prevented from deforming. Thus, conductor poor between the electric wire and the press-contact blade can be avoided surely. Further, when the battery connecting structure is scrapped, cutoff of the bus bar connecting portion and the wire connecting portion can be performed easily. Therefore, recycling efficiency can be improved.

Preferably, the wire connecting portion includes a bottom plate continuing into the bus bar connecting portion and positioning the electric wire in the surface of the bottom plate; a pair of first crimping pieces vertically respectively arranged from both ends of the bottom plate in a width direction and crimping the electric wire; a pair of second crimping pieces vertically respectively arranged from the both end of the bottom plate in a width direction and spaced apart from the pair of first crimping pieces and crimping the electric wire; and a press-contact blade arranged between the pair of first crimping pieces and the pair of second crimping pieces and connected to the core wire of the electric wire by penetrating the insulating cover of the electric wire positioned on the surface of the bottom plate. Thereby, connection between the electric wire and the press-contact blade can be securely prevented from separating by moving the electric wire away from the bottom plate.

The above and other objects and features of this invention will become more apparent from the following description taken in conjunction with the accompanying drawings.

DESCRIPTION OF THE PREFERRED EMBODIMENT

First Embodiment

A battery connecting structure according to first embodiment of the present invention will be explained with reference to FIGS. 1-8.

Figure 1:
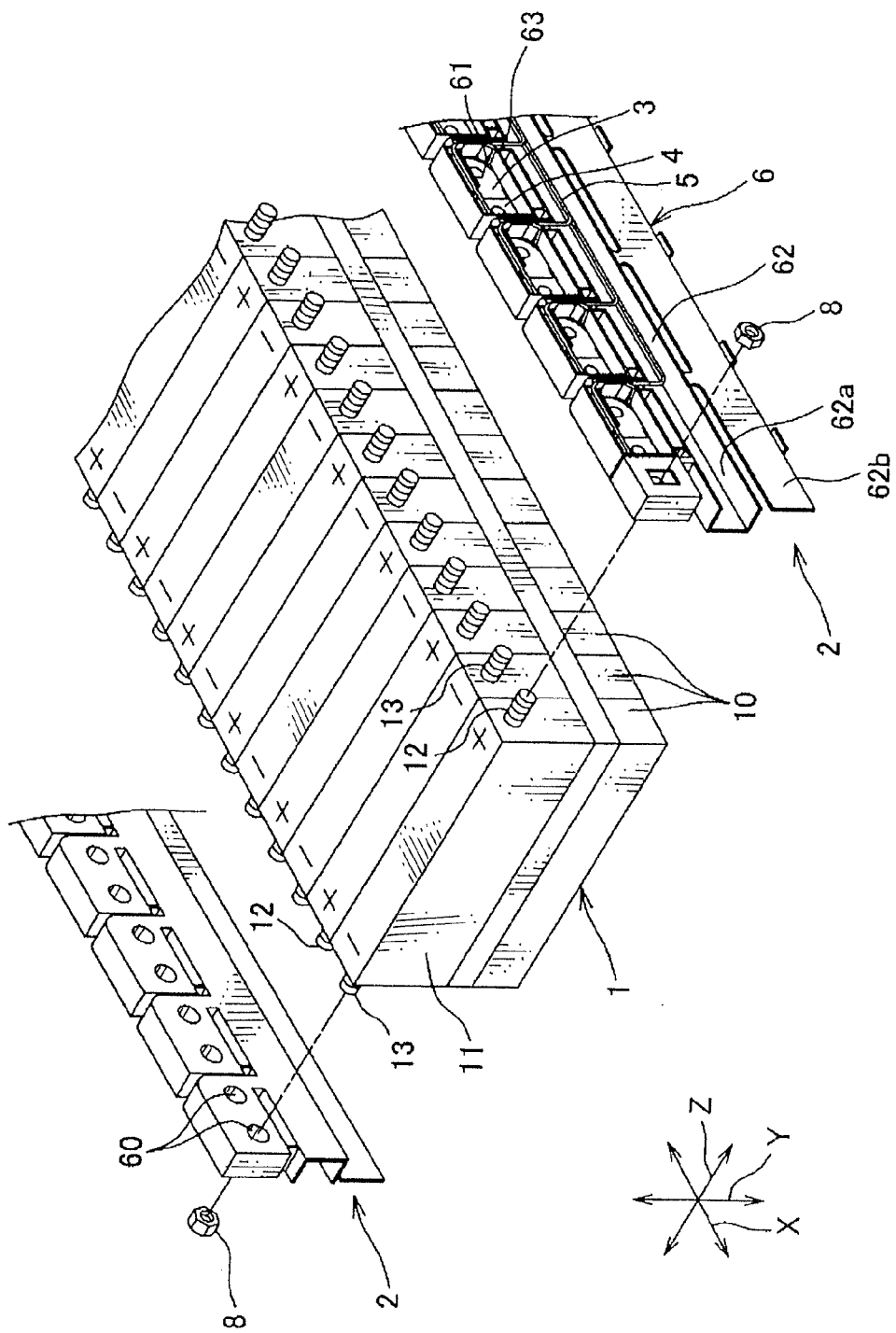
FIG. 1 is an exploded view of a power-supply device having a battery connecting structure according to first embodiment of the present invention and a battery assembly in which the battery connecting structure of the first embodiment is attached.

As shown in FIG. 1, a pair of battery connecting structures 2 of the present invention are attached to one side of a battery assembly 1 shown in FIG. 1 and the other side thereof respectively, and then installed in a power supply device. In addition, the power supply device is mounted on an electric vehicle which runs with the driving force of the electric motor and a hybrid vehicle which runs with a driving force of both an internal-combustion engine and an electric motor, and supplies electricity to the electric motor.

As shown in FIG. 1, the above battery assembly 1 has a plurality of batteries 10 and a fixing member which overlaps and fixes these the plurality of batteries 10 each other. Each battery 10 includes a box-shaped battery main body 11, a positive electrode 12 projected from one side of the battery main body 11 and a negative electrode 13 projected from the other side thereof. These positive and negative electrodes 12, 13 are made of conductive metal, and formed in a cylinder shape. In each of an outer periphery of these positive and negative electrodes 12, 13, a thread groove is arranged.

Further, the batteries 10 are alternately inversely overlapped with each other so that the positive and negative electrodes 12, 13 of the adjacent batteries 10 are arranged adjacent to each other along an overlapping direction of the batteries 10. In FIG. 1, an arrow X indicates an overlapping direction of the batteries 10 and a longitudinal direction of the battery assembly 1. Also, an arrow Z indicates a width direction of the batteries 10 (namely, a width direction of the battery assembly 1), and an arrow Y indicates a height direction of the batteries 10 (namely, a height direction of the battery assembly 1. The battery assembly 1 is mounted on the vehicle in a height direction (namely, arrow Y direction) which is parallel to a gravitational direction. That is, when the battery assembly 1 is mounted on the vehicle, an upper side along the arrow Y direction in FIG. 1 is an upper side of the gravitational direction, and a under side along the arrow Y is a under side of the gravitational direction. Further, in the above condition, the above-described positive electrode 12 projects from one side of the battery main body 11 in a horizontal direction (namely, arrow Z direction). Meanwhile, the negative electrode 13 projects from the other side of the battery main body 11 in the horizontal direction.

Figure 2:
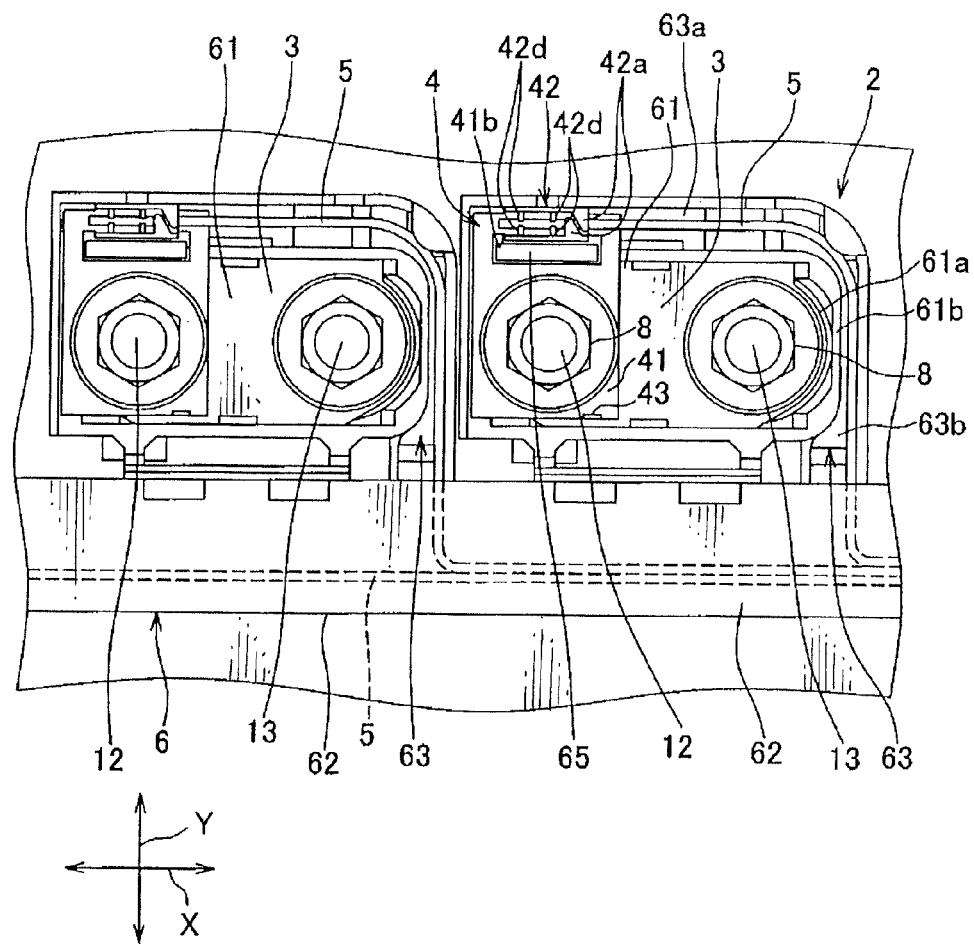
FIG. 2 is a plan view showing a part of the battery connecting structure shown in FIG. 1.

The each battery connecting structure 2 connects the previously described batteries 10 in series. Further, as shown in FIG. 2, the battery connecting structure 2 has a plurality of bus bars 3, a plurality of terminals 4, a plurality of electric wires 5 and a plate 6 made of synthetic resin. The bus bar 3 connects the batteries 10 in series by connecting the positive and negative electrodes 12, 13 of the battery 10 adjacent to each other. Each terminal 4 is overlapped with each bus bar 3 and connected thereto so as to detect a voltage of each battery 10. Each electric wire 5 is connected to each terminal 4 respectively. The plate 6 receives these.

Figure 3:
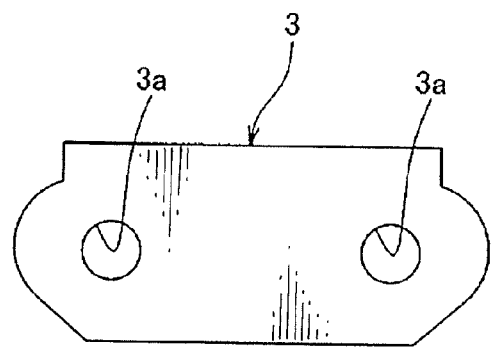
FIG. 3 is a plan view of a bus bar shown in FIG. 2.

The above bus bar 3 is made by pressing a metal plate. As shown in FIG. 3, the bus bar includes a pair of bus bar holes 3a for inserting the positive and negative electrodes 12, 13 of the battery 10 next to each other in a board-shaped metal plate. The positive electrode 12 arranged in one of the adjacent batteries 10 is inserted in one of the pair of bus bar holes 3a, and the negative electrode 13 arranged in the other of the adjacent batteries 10 is inserted in the other thereof. And then, the bus bar 3 including the bus bar holes 3a is attached to the positive electrode 12 and the negative electrode 13, and is electrically connected to them. Further, when a nut 8 is screwed to the positive and negative electrodes 12, 13 which are inserted into the bus bar holes 3a respectively, the bus bar 3 is fixed to the battery 10.

Figure 4:
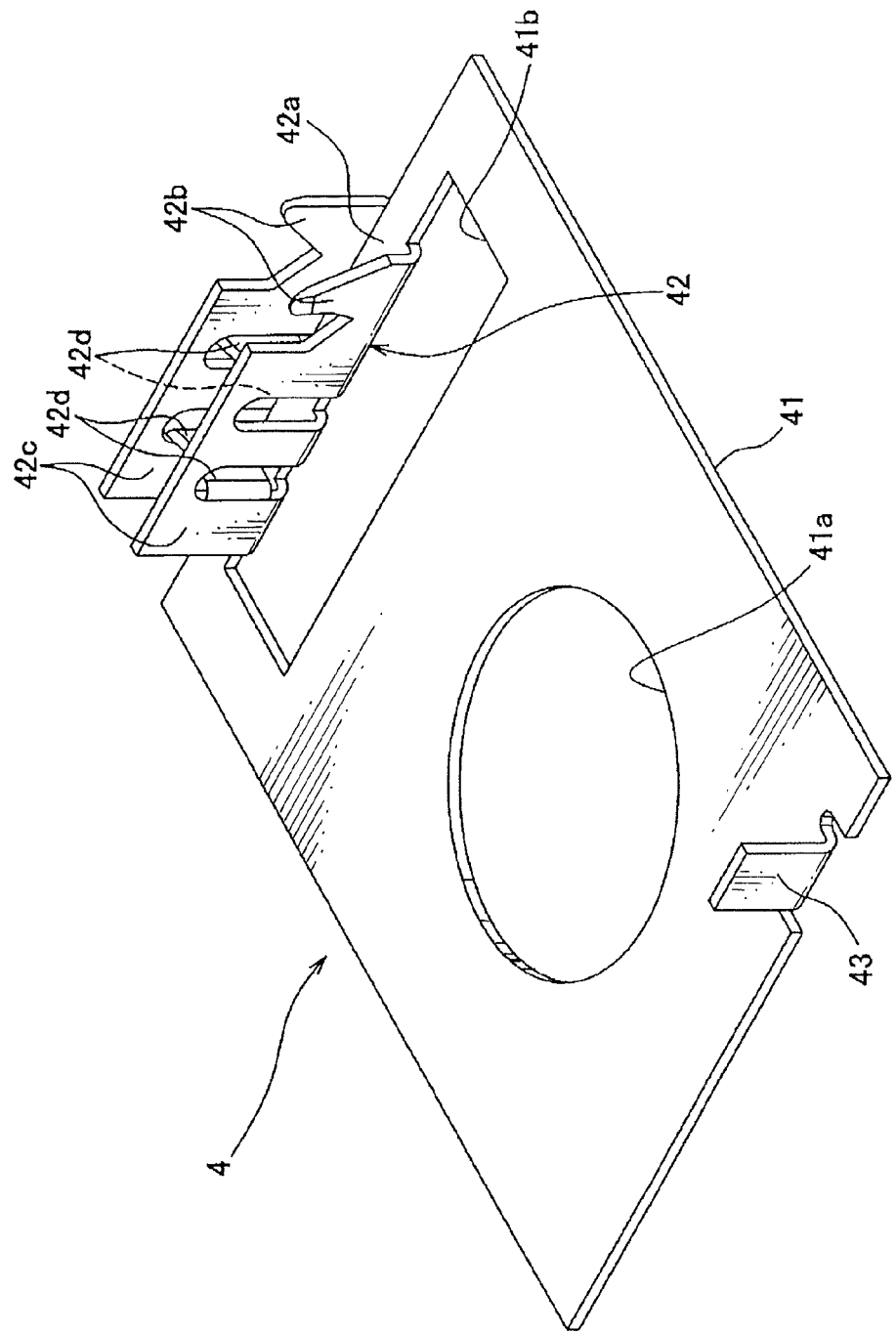
FIG. 4 is a perspective view of a terminal shown in FIG. 2.
Figure 5:
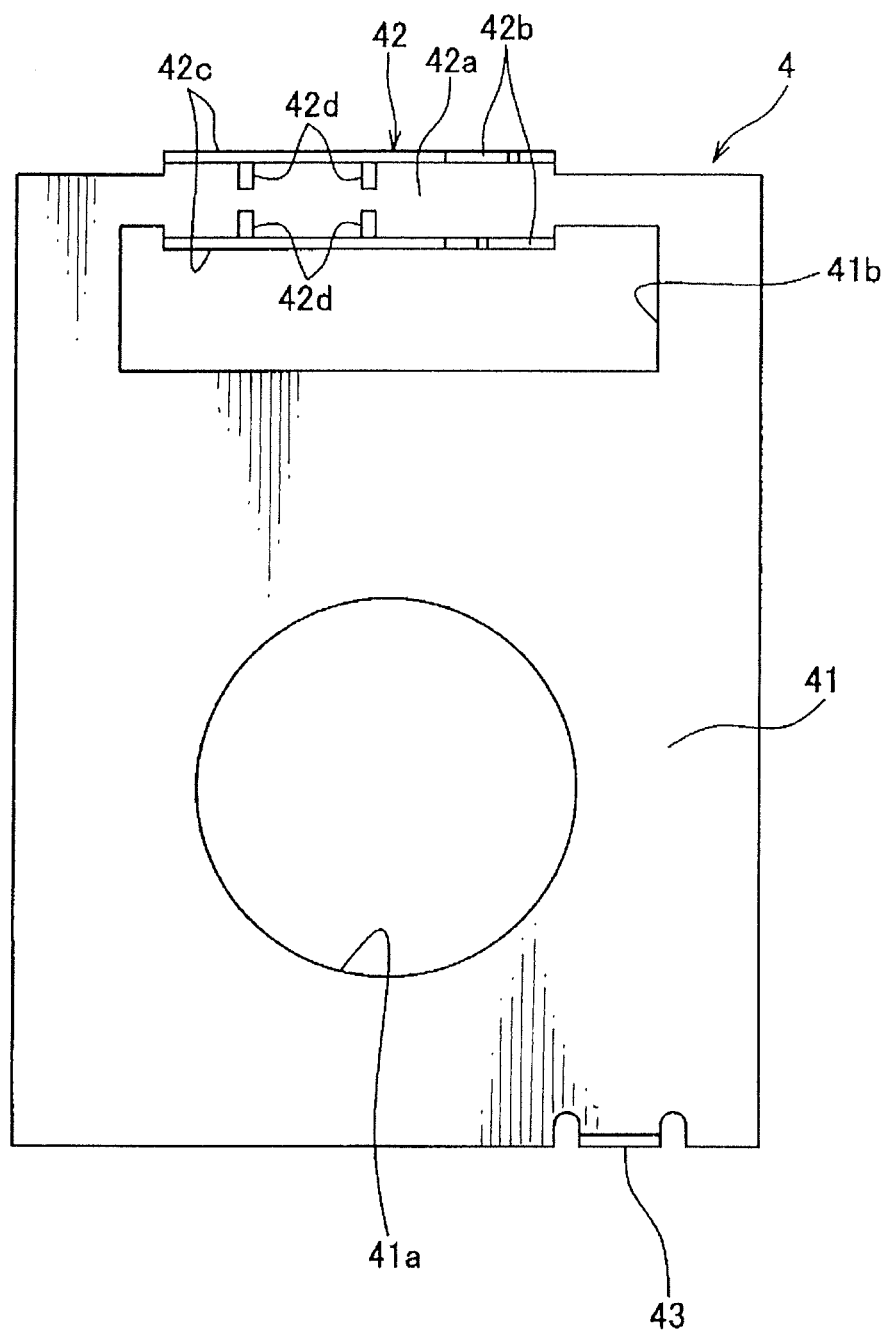
FIG. 5 is a plan view of the terminal shown in FIG. 2.
Figure 6:
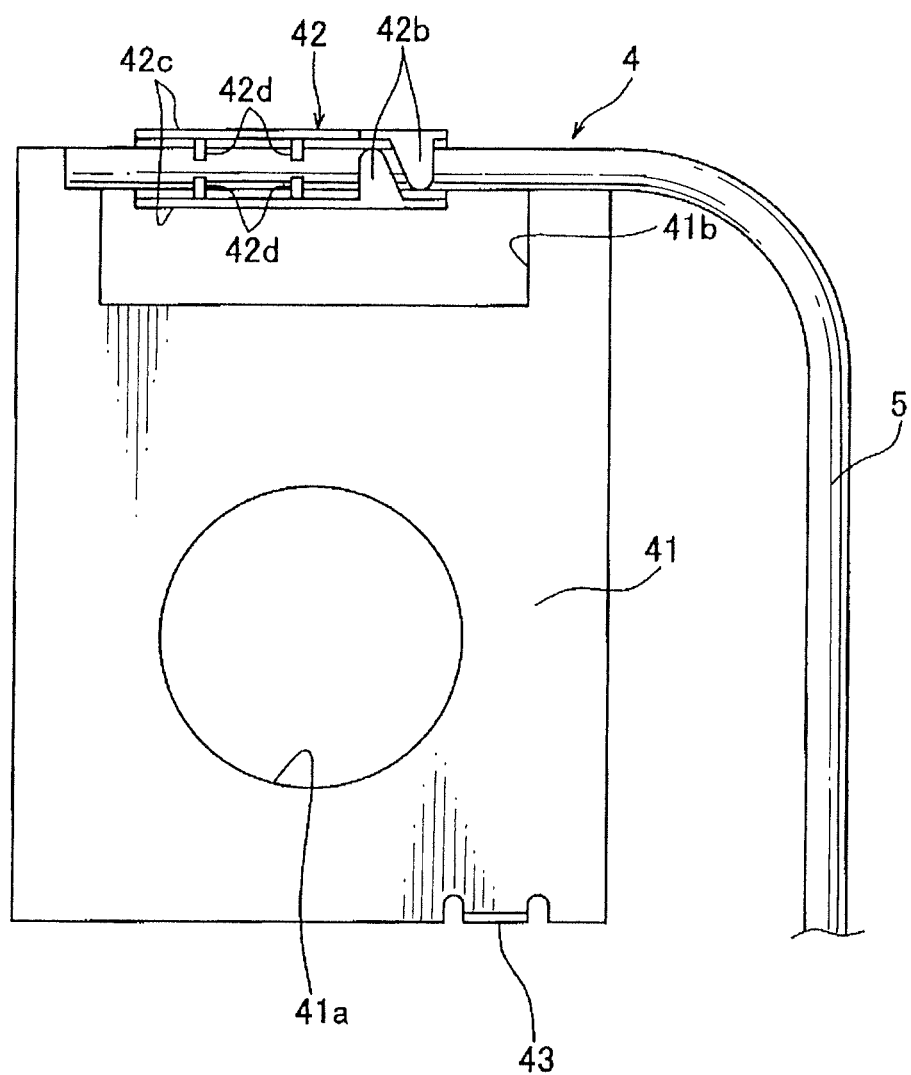
FIG. 6 is a plan view showing a condition that an electric wire is connected to the terminal shown in FIG. 2.

The terminal 4 is made by pressing a conductive metal plate. As shown in FIGS. 4-6, the terminal 4 integrally includes a bus bar connecting portion 41, a wire connecting portion 42 and a knob 43.

The bus bar connecting portion 41 is formed in a plate shape, and includes a terminal hole 41a for inserting one of the positive electrode 12 or the negative electrode 13 and a opening 41b for stopping rotation. When one of the positive electrode 12 or the negative electrode 13 is inserted into the terminal hole 41a, the bus bar connecting portion 41 is overlapped with the bus bar 3 and electrically connected therewith.

The wire connecting portion 42 includes a bottom plate 42a, a pair of crimping pieces 42b, a pair of side plates 42c and two pairs of press-contact blades 42d. The bottom plate 42a continues into the bus bar connecting portion 41, and positions the electric wire 5 on the surface thereof. The crimping pieces 42b are vertically arranged from both ends of the bottom plate 42a in the width direction respectively, and fix the electric wire 5 by crimping an insulating cover formed in an end of the electric wire 5. The side plates 42c are vertically arranged from both ends of the bottom plate 42a in the width direction, and position the electric wire 5 between them. The press-contact blades 42d project from the pair of the side plates 42c toward an inside thereof. Further, the pair of the crimping pieces 42b and the pair of the side plates 42c are disposed along a longitudinal direction of the electric wire 5. Further, the pair of the crimping pieces 42b and the pair of the side plates 42c are disposed along a longitudinal direction of the electric wire 5. One of the crimping pieces 42b and one of the side plates 42c are formed by cutting and bending a part of the bus bar connecting portion 41. Two pairs of press-contact blades 42d are respectively formed by cutting and bending a part of the pair of side plates 42c. The two pairs of press-contact blades 42d are arranged with a gap along the longitudinal direction of the electric wire 5. The two pairs of press-contact blades 42d are facing to each other. When the electric wire 5 is pressed between the press-contact blades 42d, the insulating cover of the electric wire 5 is broken. Thereby, the press-contact blades 42d contact with the core wire of the electric wire 5, and are electrically connected with the core wire. Furthermore, the two pairs of press-contact blades 42b prevent the electric wire 5 from being displaced in the longitudinal direction of the wire connecting portion 42.

Moreover, the above wire connecting portion 42 is arranged in a direction which the width direction of the wire connecting portion 42 (namely, a direction which the side plates 42c face each other) is parallel to a longitudinal direction of the bus bar connecting portion 41. More specifically, a longitudinal direction of the wire connecting portion 42 is arranged in a direction perpendicular to the longitudinal direction of the bus bar connecting portion 41. Thereby, size of a longitudinal direction of the terminal 4 can be avoided from becoming enlarged.

The knob 43 is vertically arranged from an outer edge of the bus bar connecting portion 41, and is formed in a plate shape. This knob 43 is a portion which is chucked when the terminal 4 is received in the plate 6.

The above opening 41b for stopping rotation is a hole which is formed in the bus bar connecting portion 41 by cutting and standing one of the crimping pieces 42b and one of the side plates 42c from the bus bar connecting portion 41. As shown in FIG. 2, in the opening 41b, a projection 65 which is arranged in the plate 6 is inserted. Thereby, although the terminal 4 is rotated around a center of the terminal hole 41a when the nut is screwed to the positive electrode 12 or the negative electrode 13 which inserts the terminal hole 41a of the terminal 4, an inner surface of the opening 41b abuts in the projection 65 and the rotation is regulated.

In the present invention, by cutting and standing one of the crimping pieces 42b and one of the side plates 42c from the bus bar connecting portion 41, the opening 41b formed in the bus bar connecting portion 41 is used as the opening 41b for stopping rotation of the terminal 4. Thereby, compared with a case that a projection 241b for stopping rotation of conventional terminal 204 is arranged, in the present invention, the terminal can be downsized and the battery connecting structure 2 can be miniaturized. Furthermore, metallic amount constructing the terminal 4 can be reduced.

The electric wire 5 is so-called coated electric wire in which a conductive core wire is covered by an insulating cover. Further, the electric wire 5 is a round wire having a circular section. One end of the electric wire 5 is connected to the wire connecting portion 42 of the terminal which is received in a first receiving portion 61, and the other end of the electric wire 5 is connected to a voltage detecting circuit (not shown). The electric wire 5 is arranged in the later-described third receiving portion 63 of the plate 6 and the later-described second receiving portion 62 thereof.

As shown in FIG. 1, the plate 6 has a substantially rectangular shape corresponding to a pair of side surfaces of the battery assembly 1, and is overlapped with the one side surface of the battery assembly or the other side surface thereof. As shown in FIGS. 1 and 2, the plate 6 integrally includes a plurality of first receiving portions 61, a second receiving portion 62 and a plurality of third receiving portions 63.

Each first receiving portion 61 is formed in a box shape which is able to fit each bus bar 3 with a bottom wall 61a of which surface the bus bar 3 is positioned and a peripheral wall 61b extended vertically from an edge of the bottom wall 61a. Further, each the first receiving portion 61 receives each bus bar 3 and each terminal 4 overlapped on the bus bar 3. That is, in the present invention, the bus bar connecting portion 41 and the wire connecting portion 42 in the terminal 4 are received in the first receiving portion 61. Further, in the bottom wall 61a, a pair of plate holes 60 is arranged. The plate holes 60 insert the positive electrode 12 of the battery 10 and the negative electrode 13 thereof respectively. Additionally, in the bottom wall 61a, a projection 65 which is inserted in the above mentioned opening 41b for stopping rotation is arranged. The first receiving portions 61 are arranged in an overlapping direction of the batteries 10 (namely, the arrow X direction) with a gap.

The second receiving portion 62 includes a receiving main body 62a which receives the electric wires 5 connected to each terminal 4 and a cover 62b which covers an opening of the receiving main body 62a. The receiving main body 62a is formed in a gutter shape, extends along an arranging direction of the plurality of first receiving portions 61 (namely, the arrow X direction) and parallel to the first receiving portions 61 and the arrow Y direction with a gap. The cover 62b is formed in a plate shape. That is, the second receiving portion 62 is formed in a cylindrical shape by installing the plate cover 62b in the opening of the gutter-shaped receiving main body 62. The second receiving portion 62 routes the electric wires 5 on an end along the arrow X direction of the battery 1.

The third receiving portion 63 is formed in a gutter shape connecting each first receiving portion 61 which is arranged with a space each other and the second receiving portion 62. Furthermore, the third receiving portion 63 leads each electric wire 5 which is connected to the wire connecting portion 42 of the terminal 4 received in the first receiving portion 61 from each first receiving portion 61 to the second receiving portion 62. Moreover, the third receiving portion 63 includes a separation portion 63a and a joint portion 63b. The separation portion 63a communicates with an end away from the second receiving portion 62 of the first receiving portion 61. That is, the separation portion 63a communicates with an inside of the first receiving portion 61. Further, the separation portion 63a is arranged in a position in which the first receiving portion 61 is positioned between the separation portion 63a and the second receiving portion 62, and extends linearly along an overlapping direction of the batteries 10 (namely, the arrow X direction). The joint portion 63b communicates with an end away from a joint point of the first receiving portion 61 and the separation portion 63a, and extends linearly along the arrow Y direction toward the second receiving portion 62. Further, the joint portion 63b communicates with an inside of the second receiving portion 62 through a space between the first receiving portion 61 connected to the separation portion 63a and another first receiving portion 61 adjacent to the first receiving portion 61. In other words, the third receiving portion 63 having the separation portion 63a and the joint portion 63b is formed in a L-shape along an outer edge of the first receiving portion 61. A width of the third receiving portion 63 (namely, width along a radial direction of the electric wire 5) is minimum size so as to arrange one of the electric wire 5.

In the present invention, when the terminal 4 is received in the first receiving portion 61, the wire connecting portion 42 is arranged in the end of the first receiving portion 61 disposed away from the second receiving portion 62. That is, the wire connecting portion 42 is arranged in a position adjacent to the separation portion 63a of the third receiving portion 63.

The battery connecting structure 2 having the above construction is attached to a side surface of the battery assembly 1, and the positive electrode 12 and the negative electrode 13 are inserted in the pair of the bus bar holes 3a respectively. In this condition, as shown in FIG. 1, the first receiving portions 61 are arranged above the second receiving portion 62 in the gravitational direction, and each wire connecting portion 42 is arranged above the positive and negative electrodes 12, 13 which are inserted into the pair of the bus bar holes 3a respectively.

According to the battery connecting structure 2 in the present invention, when the battery connecting structure 2 is attached to the side surface of the battery assembly 1, the wire connecting portion 42 is arranged above the bus bar holes 3a of the bus bar 3. Namely, the wire connecting portion 42 is arranged above the positive electrode 12 and the negative electrode 13. Thereby, the joint between the wire connecting portion 42 and the electric wire 5 can be prevented from being wet with water droplet which adhere to the positive electrode 12 or the negative electrode 13 and fall down under one's own weight. Therefore, the joint between the terminal 4 and the electric wire 5 can be prevented from getting wet with water.

Further, according to the battery connecter 2 in the present invention, the wire connecting portion 42 is received in the first receiving portion 61, and the joint between the wire connecting portion 42 and the electric wire 5 is not arranged in the third receiving portion 63 having a width smaller than the first receiving portion 61 and the second receiving portion 62. Thereby, density of the third receiving portion 63 can be prevented from becoming high. Therefore, the battery connecting structure 2 can prevent the water droplet occurred by condensation from entering into the first receiving portion 61 from the second receiving portion 62 and the third receiving portion 63 through a surface of the electric wire 5 by capillary action. Thus, the joint between the terminal 4 and the electric wire 5 can be prevented from getting wet with water.

Further, according to the present invention, the wire connecting portion 42 is arranged in an end away from the first receiving portion 61 and the second receiving portion 62, and the third receiving portion 63 includes the separation portion 63 *a* communicating with the end away from the second receiving portion 62 of the first receiving portion 61 and the joint portion 63*b* communicating with the second receiving portion 62 passing between the first receiving portion 61 and the other first receiving portion 61 adjacent to the first receiving portion 61. Thereby, since the distance from the second receiving portion 62 to the wire connecting portion 42 is long, water droplet occurred by condensation and so on can be prevented from entering into the first receiving portion 61 to the second receiving portion 62 and the third receiving portion 63 passing through the surface of the electric wire 5. Therefore, the joint between the terminal 4 and the electric wire 5 can be prevented from getting wet with water. Thus, quality of the battery connecting structure 2 can be improved.

Next, an assembling procedure of the above-mentioned battery connecting structure 2 will be explained. Before the battery connecting structure 2 is assembled, the bus bar 3, the terminal 4, the plate 6, and the like have been separately produced. Then, each bus bar 3 is inserted in each plate 6. That is, the bus bars 3 are received in the plates 6 respectively. When the bus bar 3 is inserted in the first receiving portion 61, the plate hole 60 arranged in the first receiving portion 61 and the bus bar hole 3*a* are overlapped. Alternatively, each bus bar 3 may be previously insert-molded into each first receiving portion 61.

Next, each terminal 4 is overlapped on each bus bar 3 so that the projection 65 arranged in the plate 6 is inserted in the opening 41*b* for stopping rotation which is arranged in the bus bar connecting portion 41 of the terminal 4. And then, the terminal 4 is received in the first receiving portion 61. This operation is automatically performed with a machine. When the terminal 4 is received in the first receiving portion 61 by the machine, the above-described knob 43 is chucked with the machine and received in the first receiving portion 61.

Conventionally, it is necessary to receive the terminal 204 in which an electric wire 205 is previously connected in a bus bar receiving portion 261 and a wire connection receiving portion 263. Also, the work receiving the terminal 204 and the electric wire 205 in the plate 206 needs to perform by hand work. However, in the present invention, the wire connecting portion 42 for press-contacting the electric wire 5 with the terminal 4 is arranged. Thereby, the terminal 4 in which the electric wire 5 is not attached can be received in the first receiving portion 61. Therefore, the work receiving the terminal 4 in the first receiving portion 61 can be automatically performed, and assembly cost of the battery connecting structure 2 can be reduced. Further, since the above-described hand work is automated, human error can be decreased and quality of the battery connecting structure 2 can be improved. Additionally, in the present invention, the terminal 4 can be previously insert-molded into the first receiving portion 61.

Further, in the present invention, the knob 43 is arranged in the terminal 4. Thereby, the terminal 4 can be chucked with a machine, and automation of work receiving the terminal 4 in the first receiving portion 61 becomes easier.

Figure 7:
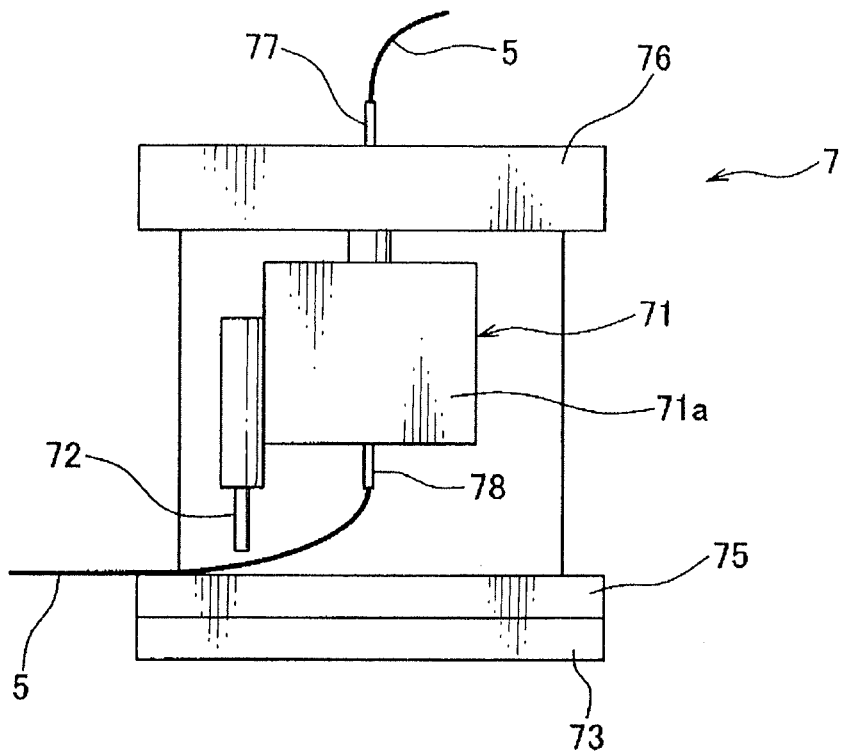
FIG. 7 is a plan view of an automatic wiring machine connecting the electric wire to the terminal shown in FIG. 2.
Figure 8:
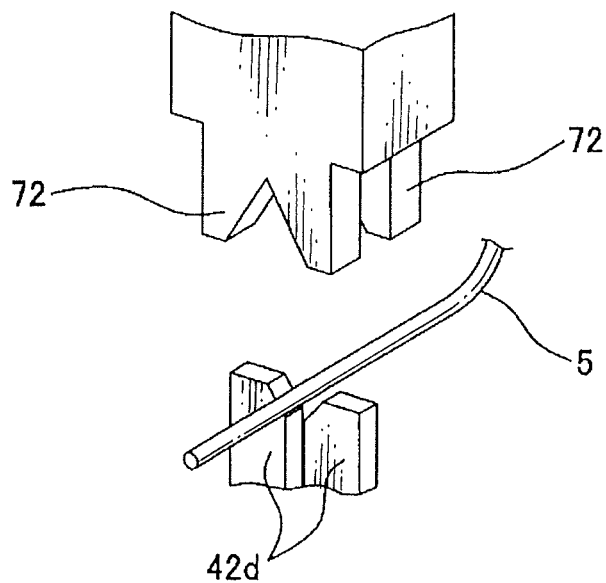
FIG. 8 is a perspective view showing a main part of the automatic wiring machine shown in FIG. 7.

Next, by using an automatic wiring machine 7 shown in FIGS. 7 and 8, the electric wire 5 is arranged in the second receiving portion 62 and the third receiving portion 63, and one end of the electric wire 5 is connected to the wire connecting portion 42 of the terminal 4. The automatic wiring machine 7 includes a wiring head 71, a pressure welding crimper 72, a fixed frame 73 supporting the wiring head 71 and the pressure welding crimper 72, and a moving table 75 arranged on the fixed frame 73. The moving frame 75 mounts a wiring plate and is moved in all directions. The movement of the moving table 75 is controlled by a microcomputer and the like.

A casing 71*a* of the wiring head 71 is arranged in an upper plate 76 of the fixed frame 73 and moves up and down freely. In a top end of the upper plate 76, a wiring leading-in tube 77 is arranged. Further, in a bottom end of the casing 71*a*, a wiring supply tube 78 is arranged. In a side surface of the casing 71*a*, a pair of the pressure welding crimper 72 is arranged at a moving-up and down state. The pressure welding crimper 72 is used for pressing an electric wire, and is formed in a V-shaped.

By using the automatic wiring machine 7, process for arranging the electric wire 5 in the second receiving portion 62 and the third receiving portion 63 and for connecting one end of the electric wire 5 to the wire connecting portion 42 will be explained. First, the plate 6 receiving the bus bar 3 and the terminal 4 is placed on the wiring plate. Next, the moving table 75 is moved so that the tip of the wiring supply tube 78 moves the electric wire 5 which is received in the second receiving portion 62 and the third receiving portion 63 along a desired line. More specifically, the moving table 75 is moved so as to move the tip of the wiring supply tube 78 from an end of the second receiving portion 62 in the arrow X direction toward the wire connecting portion 42 of the terminal 4. The electric wire 5 is sent out from the wiring supply tube 78 by a wiring feeding deice (not shown) which is built into the casing 71*a* based on the movement of the moving table 75. Thereby, the electric wire 5 is arranged in the second receiving portion 62 and the third receiving portion 63.

After the wiring supply tube 78 is moved to the wire connecting portion 42, as shown in FIG. 8, the moving table 75 is moved so as to locate the electric wire 5 which is supplied from the wiring supply tube 78 immediately above a space between the pair of the press-contact blades 42*d*. Incidentally, in FIG. 8, the side plate 42*c* of the wire connecting portion 42 is not shown. Then, the pair of the pressure welding crimpers 72 are moved down, and the electric wire 5 is pressed between the pair of press-contact blades 42*d*. Thereby, the press-contact blades 42*d* are connected to the core wire of the electric wire 5 by breaking the insulating cover of the electric wire 5. Further, with respect to another the pair of the press-contact blades 42*d*, the electric wire 5 is pressed in a similar process. Subsequently, the pair of the crimping pieces 42*b* is crimped, and the electric wire 5 is attached. Thus, the battery connecting structure 2 is assembled.

As described above, in the present invention, the wire connecting portion 42 for pressing the electric wire 5 in the terminal 4 is arranged. Thereby, the electric wire 5 which is not connected to the terminal 4 can be arranged and received in the second receiving portion 62 and the third receiving portion 63. Therefore, work for arranging the electric wire 5 in the second receiving portion 62 and the third receiving portion 63 can be automated by using the automatic wiring machine 7 shown in FIG. 7. As a result, cost for assembling the battery connecting structure 2 can be reduced.

Furthermore, the pair of the battery connecting structure 2 assembled by the above described process is overlapped on one side surface of the battery assembly 1 and the other side surface, and is attached to the battery assembly 1 by screwing the nut on the positive and negative electrodes 12, 13 which are inserted in the plate hole 60, the bus bar hole 3*a* and the terminal hole 41*a*.

Second Embodiment

Figure 9:
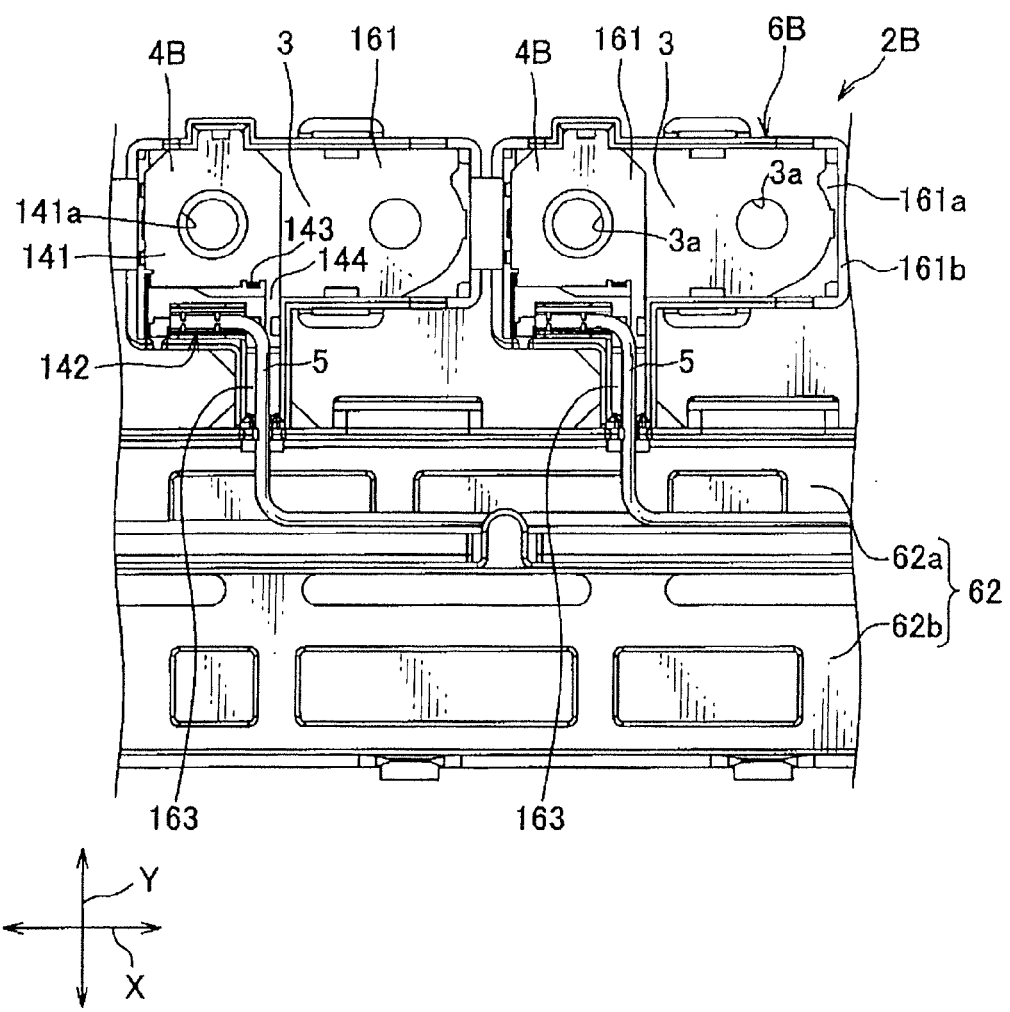
FIG. 9 is a plan view showing a part of the battery connecting structure according to second embodiment of the present invention.

Next, the battery connecting structure according to the second embodiment of the present invention will be explained with reference to FIG. 9. In FIG. 9, components already described with reference to the first embodiment are denoted by the same reference numerals, and thus detailed description thereof will be hereinafter omitted.

As shown in FIG. 9, the power supply device includes the battery connecting structure 2B of the present invention which is attached to one side surface of the battery assembly 1 shown in the first embodiment or the other side surface thereof.

The battery connecting structure 2B includes a plurality of bus bars 3, a plurality of terminals 4B overlapped with the bus bars 3 respectively and connected to the bus bar 3, a plurality of electric wires 5 connected to the terminal 4B respectively, and a plate 6B made of synthetic resin and receiving these.

The terminal 4B is made by pressing a metal plate, and integrally includes a bus bar connecting portion 141 formed in a plate shape, a wire connecting portion 142, a knob 143, and a joint portion 144. The bus bar connecting portion 141 is overlapped on the bus bar 3 in a condition that one of the positive electrode 12 or the negative electrode 13 is inserted in the terminal hole 141*a*, and electrically connected to the bus bar 3. The wire connecting portion 142 includes two pair of press-contact blades which penetrate the insulating cover of the electric wire 5 and electrically connected to the core wire when the electric wire 5 is pressed between the press-contact blades. The knob 143 extends vertically from an outer edge of the bus bar connecting portion 141 and is chucked when the terminal 4B is received in the plate 6B by a machine. The joint portion 144 connects the bus bar connecting portion 141 and the wire connecting portion 142.

The plate 6B is formed in a substantially rectangular shape corresponding to a pair of side surfaces of the battery assembly 1, and overlapped with the one side surface of the battery assembly or the other side surface thereof. The plate 6*b* integrally includes a plurality of first receiving portions 161, the second receiving portion, and a plurality of third receiving portions. The first receiving portion 161 receive the bus bar 3 and the terminal 4B overlapped on the bus bar 3, and is arranged along the arrow X direction with a space. The second receiving portion 62 extends along an arranging direction of the first receiving portions 161, and is arranged parallel to the first receiving portions 161 in the arrow Y direction with a space. Further, the second receiving portion 62 receives the plurality of electric wires 5 connected to each the terminal 4B. The third receiving portion 163 communicates with an inside of the first receiving portion 161 and an inside of the second receiving portion 62, and leads each electric wire 5 connected to each terminal 4B from the first receiving portion 161 to the second receiving portion 62.

The above first receiving portion 161 is formed in a box shape which is able to attached to each bus bar 3 with a bottom wall 161*a* which locates each bus bar 3 on a surface and a peripheral wall 161*b* which is vertically arranged from an outer edge of the bottom wall 161*a*, and receives each bus bar 3 and each terminal 4B overlapped on the bus bar 3. Namely, in the present invention, the bus bar connecting portion 141 and the wire connecting portion 142 are received in the first receiving portion 161.

The above third receiving portion 163 is arranged between each of the first receiving portions 161 arranged with a space each other and the second receiving portion 62, and extends along the arrow Y direction with a gutter shape. Further, a width of the third receiving portion 163 (namely, a width along a radial direction of the electric wire 5) is formed with a minimum required size so as to arrange the electric wire 5.

Furthermore, in the present invention, when the terminal 4B is received in the first receiving portion 161, the wire connecting portion 142 is arranged in an end of the first receiving portion 161 close to the second receiving portion 62, and is laterally (namely, the arrow X direction) displaced with respect to the third receiving portion 163. That is, the wire connecting portion 142 and the third receiving portion 163 are not arranged in the same straight line along the arrow Y direction.

The battery connecting structure 2B having the above construction is attached to a side surface of the battery assembly 1. When the positive electrode 12 and the negative electrode 13 is inserted into the pair of bus bar holes 3*a*, the first receiving portions 161 are arranged above the gravitational direction of the second receiving portion 62 and the third receiving portions 163, and each wire connecting portion 142 is arranged below the gravitational direction of the positive and negative electrodes 12, 13 which are inserted into the bus bar holes 3 respectively.

According to the battery connecting structure 2B having the above construction of the present invention, while the battery connecting structure 2B is attached to the side surface of the battery assembly 1, the first receiving portions 161 are arranged above the gravitational direction of the second receiving portion 62 and the third receiving portions 163. Thereby, even if water such as water droplet which adhere to the positive electrode 12 or the negative electrode 13 by condensation and the like and fall down under one's own weight enters into the first receiving portion 161, the water is immediately eliminated toward the third receiving portion 163 positioning below the gravitational direction of the first receiving portion 161 and the second receiving portion 62 positioning below the gravitational direction of the first receiving portion 161. Therefore, a joint between the wire connecting portion 142 and the electric wire 5 can be prevented from be exposed to the water for many hours. Thus, the joint between the terminal 4B and the electric wire 5 can be avoided from getting wet with water.

Further, according to the battery connecting structure 2B of the present invention, the wire connecting portion 142 is received in the first receiving portion 161, and the joint between the wire connecting portion 142 and the electric wire 5 is not arranged in the third receiving portion 163 in which the width thereof is smaller than widths of the first receiving portion 161 and of the second receiving portion 62. Thereby, the density of the third receiving portion 163 can be prevented from increasing. Therefore, the battery connecting structure 2B can prevent the water droplet occurred by condensation and the like from entering into the first receiving portion 161 from the second receiving portion 62 and the third receiving portion 163 through the surface of the electric wire 5 by capillary action. Thus, the joint between the terminal 4B and the electric wire 5 can be prevented from getting wet with water. By these, the quality of the battery connecting structure 2B can be improved.

Third Embodiment

Figure 10:
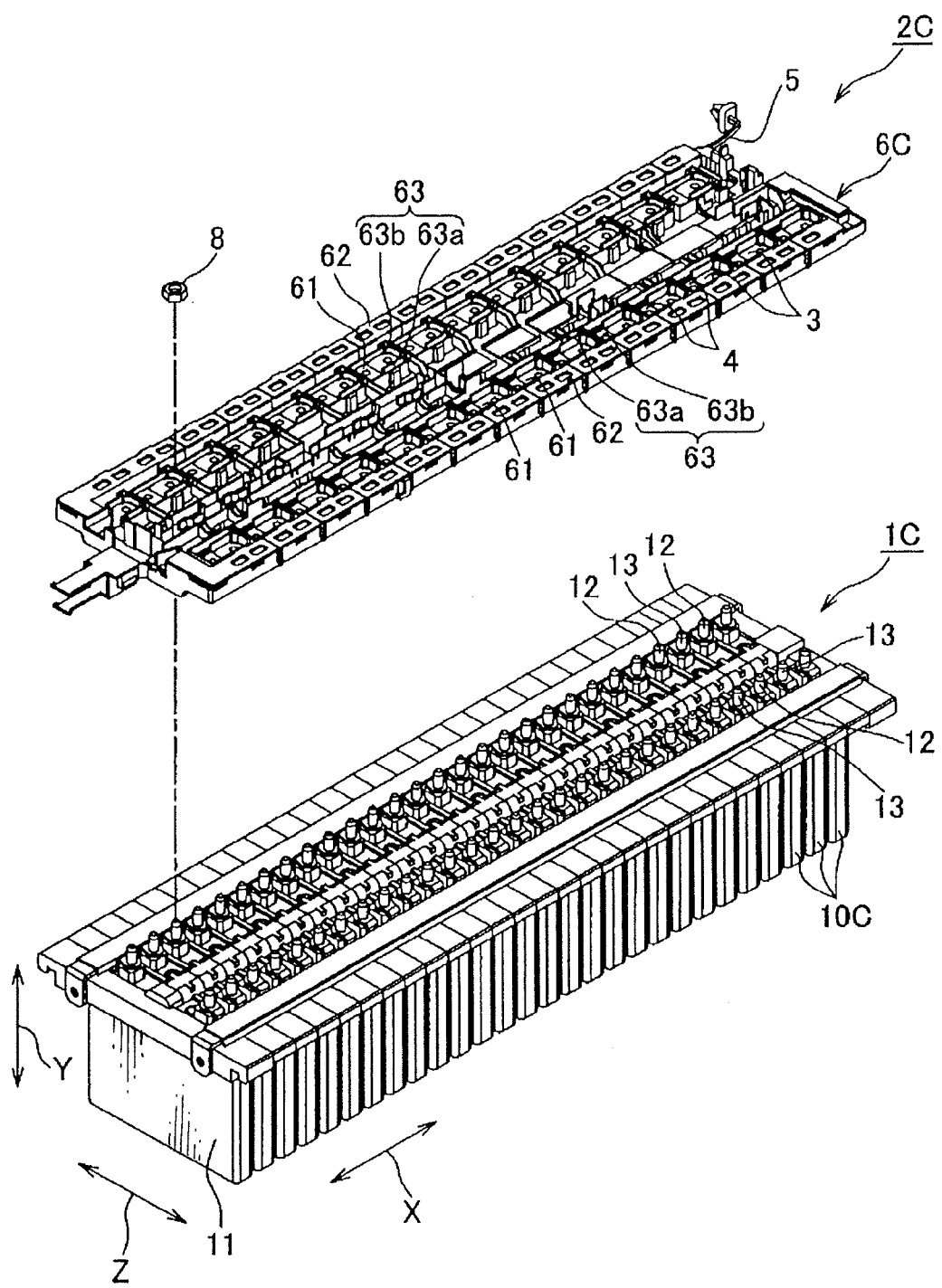
FIG. 10 is an exploded view of the power-supply device having the battery connecting structure according to third embodiment of the present invention and the battery assembly in which the battery connecting structure of the third embodiment is attached.

Next, a battery connecting structure according to third embodiment of the present invention will be explained with reference to FIG. 10. In FIG. 10, components already described with reference to the first and second embodiments are denoted by the same reference numerals, and thus detailed description thereof will be hereinafter omitted.

As shown in FIG. 10, a battery supply device includes the battery connecting structure 2C of the present invention which is attached to an upper surface of the battery assembly 1C shown in FIG. 10.

As shown in FIG. 10, the above battery assembly 1C includes a plurality of batteries 10C and a fixing member for overlapping and fixing the batteries 10C each other. Further, each battery 10C includes a box-shaped battery main body 11 and positive and negative electrodes 12, 13 respectively projected from one end and the other end of an upper surface of the battery main body 11.

The batteries 10C are overlapped along an overlapping direction of the batteries 10C so that the positive electrode 12 and negative electrode 13 are alternately arranged. Further, an arrow X in FIG. 10 indicates an overlapping direction of the batteries 10C and a longitudinal direction of the battery assembly 1C, an arrow Z indicates a width direction of each battery 10C (namely, a width direction of the battery assembly 1C), and an arrow Y indicates a height direction of each battery 10C (namely, a height direction of the battery assembly 1C). The battery assembly 1C is mounted on a vehicle in a direction in which the height direction (arrow Y direction) is parallel to the gravitational direction. That is, when the battery assembly 1C is mounted on the vehicle, an upper side along the arrow Y direction in FIG. 10 is an upper side of the gravitational direction, and a lower side along the arrow Y direction is a lower side of the gravitational direction. Furthermore, when the battery assembly 1C is mounted on the vehicle, the positive and negative electrodes 12, 13 project from an upper surface of the battery main body 11 in each battery 10C to the arrow Y direction.

The above battery connecting structure 2C includes a plurality of the bus bars 3, a plurality of the terminals 4 overlapped with each bus bar 3 and connected to the bus bar 3, a plurality of the electric wires 5 connected to each terminal 4, and the plate 6C which is made of synthetic resin and receives these.

The above plate 6C has a substantially rectangular shape corresponding to the upper surface of the battery assembly 1C, and is overlapped with the upper surface of the battery assembly 1C. The plate 6C integrally includes a plurality of first receiving portions 61, second receiving portion 62 and a plurality of third receiving portions 63. The first receiving portions 61 receive each bus bar 3 and each terminal 4 overlapped with the bus bar 3, and are arranged along the arrow X direction with a gap each other. The second receiving portion 62 extends along an arranging direction of the first receiving portions 61, spaced in parallel to the first receiving portion in the arrow Z direction, and receives the electric wires 5 connected to the terminal 4. The third receiving portions 63 lead the electric wires 5 connected to the terminal 4 from each first receiving portion 61 to the second receiving portion 62.

Further, in the above plate 6C, a plurality of the first receiving portions 61 are arranged in two rows, and the second receiving portion 62 is arranged in two rows. That is, the plate 6C is constructed so that the plate 6 described in the first embodiment is arranged in the arrow Z direction with two rows.

Such the battery connecting structure 2C is overlapped on an upper side of the battery assembly 1C, and attached to the battery assembly 1C by screwing the nut 8 into the positive and negative electrodes 12, 13 which are inserted into the terminal hole 41a (see FIGS. 1-4).

According to the battery connecting structure 2C of the present invention having the above described construction, the wire connecting portion 42 is received in the first receiving portion 61, and a joint between the wire connecting portion 42 and the electric wire 5 is not arranged in the third receiving portion 63 in which a width of the third receiving portion 63 is smaller than widths of the first receiving portion 61 and of the second receiving portion 62. Thereby, the density of the third receiving portion 63 can be prevented from increasing. Therefore, the battery connecting structure 2C can prevent water droplet occurred by condensation from entering into the first receiving portion 61 from the second receiving portion 62 and the third receiving portion 63 through the surface of the electric wire 5 by capillary action. Thus, the joint between the terminal 4 and the electric wire 5 can be prevented from being wet with water. Therefore, quality of the battery connecting structure 2C can be improved.

Fourth Embodiment

Figure 11:
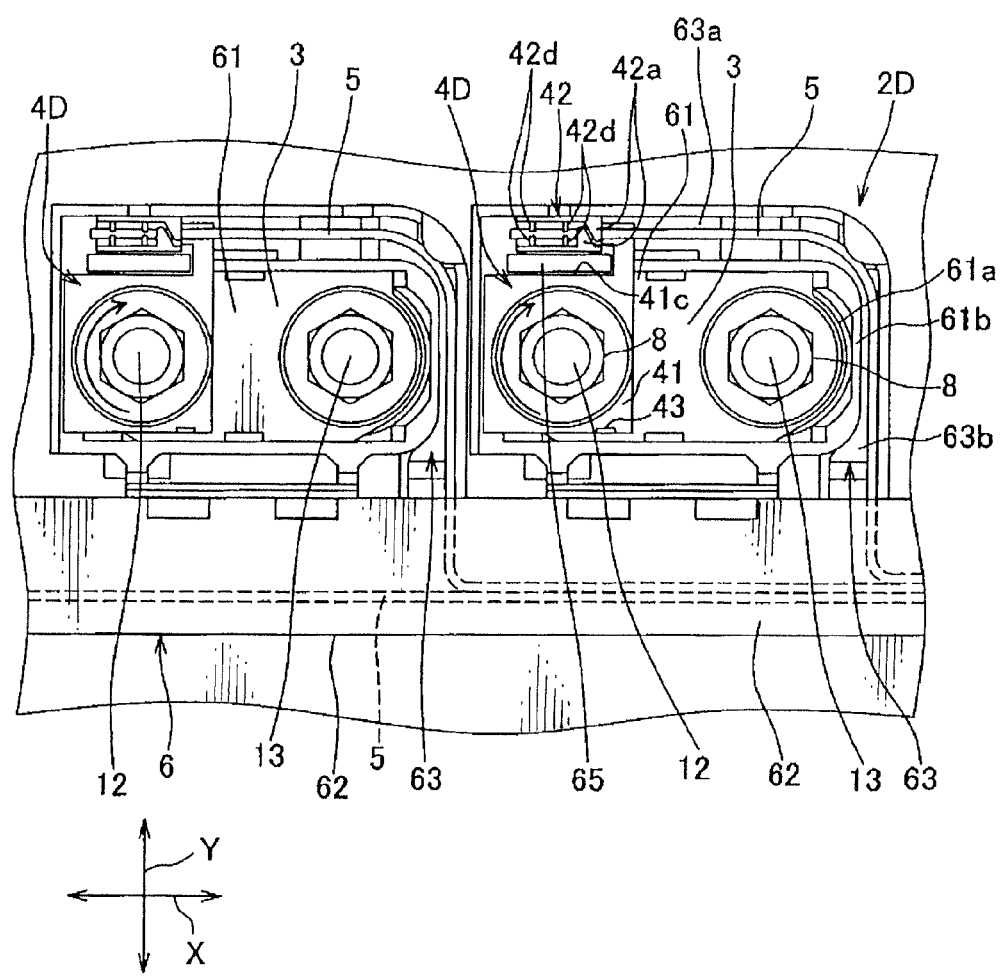
FIG. 11 is a plan view showing a part of the battery connecting structure according to fourth embodiment of the present invention.
Figure 12:
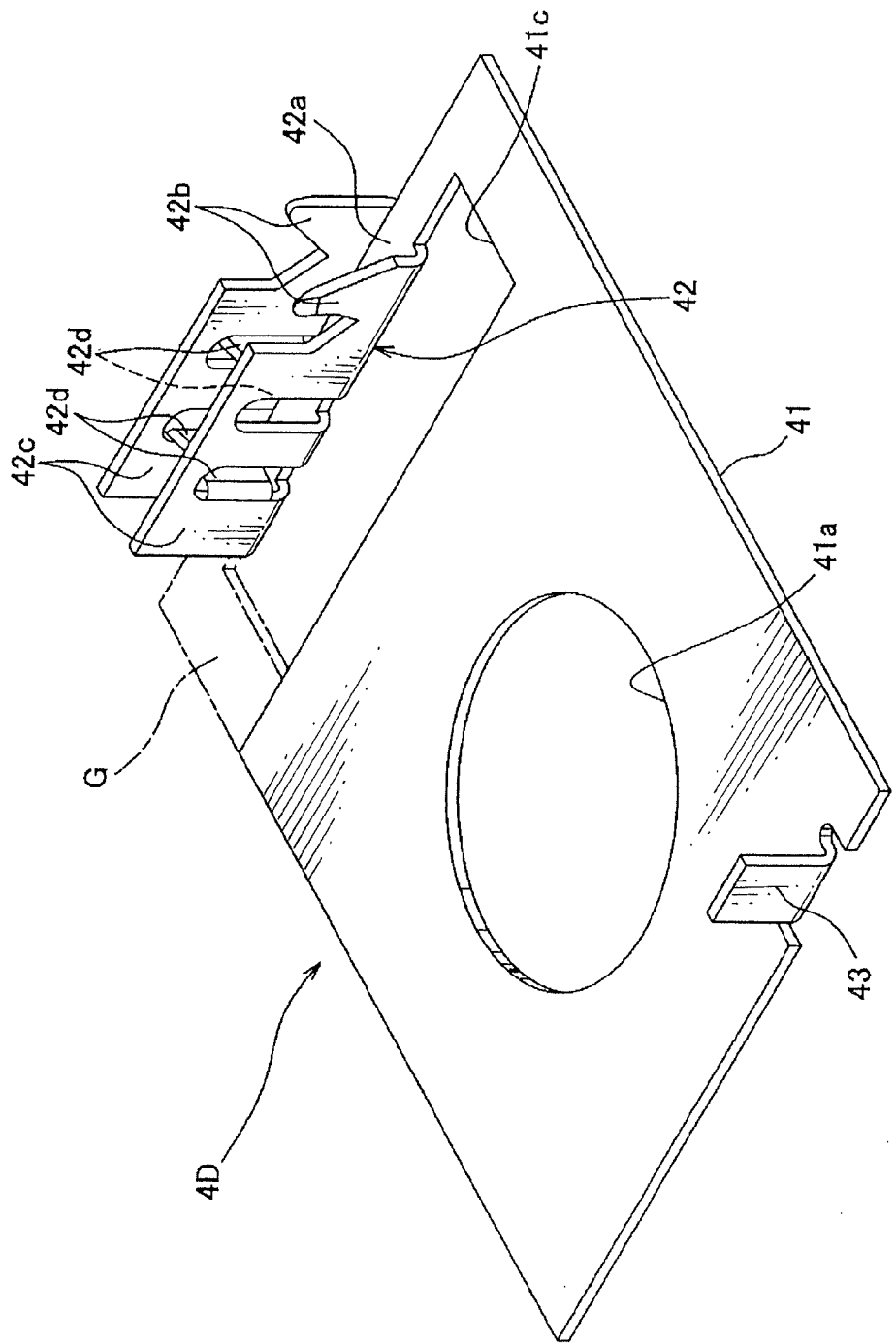
FIG. 12 is a perspective view of a terminal shown in FIG. 11.
Figure 13:
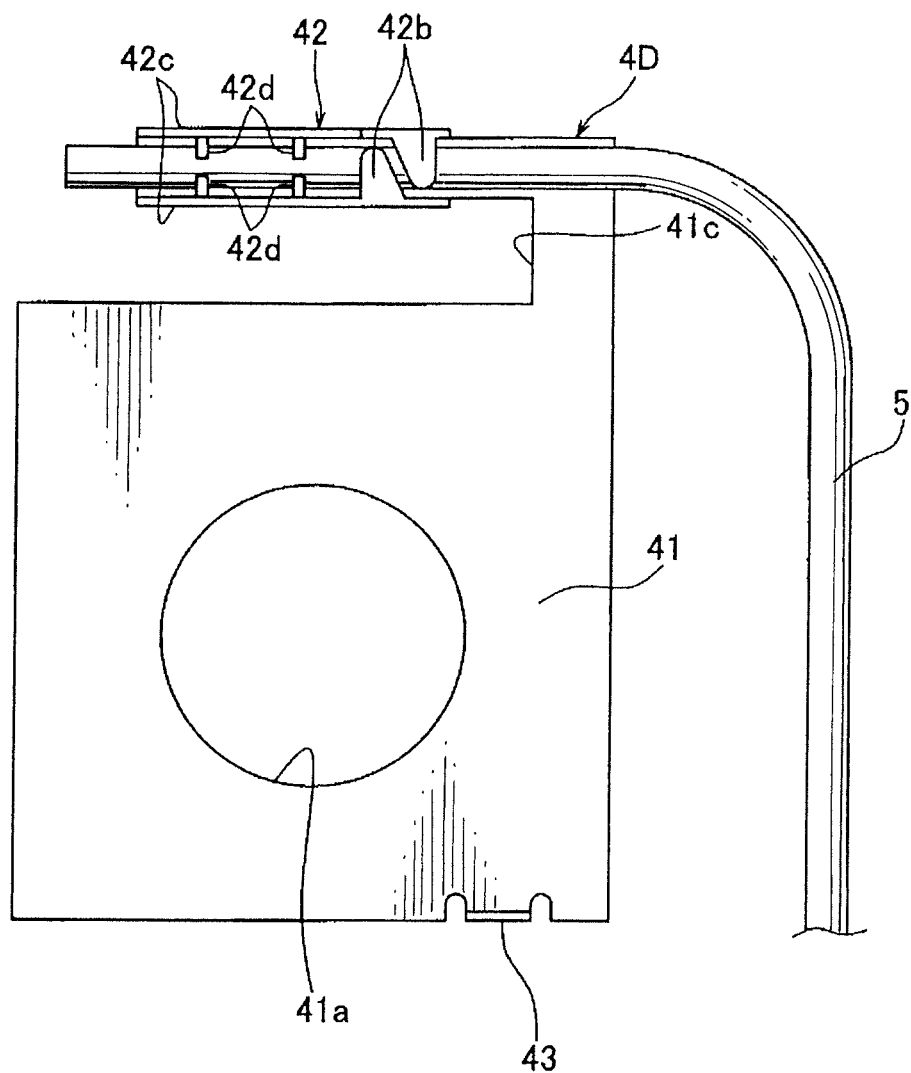
FIG. 13 is a plan view showing a condition that the electric wire is connected to the terminal shown in FIG. 11.

Next, the battery connecting structure according to the fourth embodiment of the present invention will be explained with reference to FIGS. 11-13. In FIGS. 11-13, components already described with reference to the first embodiment are denoted by the same reference numerals, and thus detailed description thereof will be hereinafter omitted.

As shown in FIG. 11, a power supply device includes the battery connecting structure 2D of the present invention which is attached to one side surface of the battery assembly 1 shown in the first embodiment or the other side surface thereof.

The battery connecting structure 2D includes a plurality of bus bars 3, a plurality of terminals 4D overlapped with the bus bars 3 respectively and connected to the bus bar 3, a plurality of electric wires 5 connected to the terminal 4D respectively, and a plate 6 made of synthetic resin and receiving these.

As shown in FIG. 12, the above terminal 4D is constructed with the same as the terminal 4 (see FIG. 4) shown in the first embodiment except a G portion shown in dashed line is cut and removed. That is, as shown in FIGS. 12 and 13, the terminal 4D integrally includes a bus bar connecting portion 41, a wire connecting portion 42 and a knob 43.

The bus bar connecting portion 41 includes a terminal hole 41a and an opening 41c for stopping rotation.

The above wire connecting portion 42 includes a bottom plate 42a, a pair of crimping pieces 42b, a pair of side plate 42c and two pairs of press-contact blades 42d. The bottom plate 42a is formed in a cantilever plate shape in which only one end continues into the bus bar connecting portion 41, and places the electric wire 5 on the surface thereof. The crimping pieces 42b are vertically arranged from both ends of the bottom plate 42a in the width direction respectively, and fix the electric wire 5 by crimping an insulating cover of an end of the electric wire 5. The side plates 42c are respectively vertically arranged from both ends of the bottom plate 42a in the width direction, and position the electric wire 5 between the side plates 42c. The two pairs of press-contact blades 42d project from the side plate 42c toward the inside thereof. Further, the two pairs of press-contact blades 42d are respectively arranged in an opposite position. When the electric wire 5 is pressed between the press-contact blades 42d (namely, the electric wire 5 is positioned on the surface of the bottom plate 42a), the press-contact blades 42d penetrate the insulating cover of the electric wire 5 and are electrically connected to the core wire of the electric wire 5.

The opening 41c for stopping rotation is a rectangular notch which is formed in the bus bar connecting portion 41 by cutting and standing one of the crimping pieces 42b and one of the side plates 42c from the bus bar connecting 41, and by cutting out the G portion from the bus bar connecting portion 41. In the opening 41c, as shown in FIG. 11, a projection 65 arranged in the plate 6 is inserted. Thereby, when the nut 8 is screwed in the positive electrode 12 inserted into the terminal hole 41a of the terminal 4D or the negative electrode 13 inserted into the terminal hole 41a of the terminal 4D (show a rotation direction of the nut 8 in FIG. 11 with an arrow), even if the terminal 4D is rotated around the terminal hole 41a, the rotation is controlled because an inner surface of the opening 41c abuts against the projection 65.

According to the battery connecting structure 2D having the above described construction of the present invention, the cantilever plate shaped bottom plate 42a of which only one end continues to the bus bar connecting portion 41 is arranged in the wire connecting portion 42 of the terminal 4D. Thereby, when the nut 8 is screwed in the positive electrode 12 of the battery 10 and the negative electrode 13 thereof and then the wire connecting portion 42 contacts with the plate 6 so as to rotate the terminal 4D, a joint between the bottom plate 42a and the bus bar connecting portion 41 is bent and the bottom plate 42a is moved. Thereby, stress can be prevented from concentrating in the press-contact blade 42d. Furthermore, the press-contact blade 42d can be avoided from deforming. Thus, poor conductor between the electric wire and the press-contact blade 42d can be prevented securely. Further, when the battery connecting structure 2D is discarded, cutoff of the bus bar connecting portion 41 and the wire connecting portion 42 can be performed easily, and recycling efficiency can be improved.

Fifth Embodiment

Figure 14:
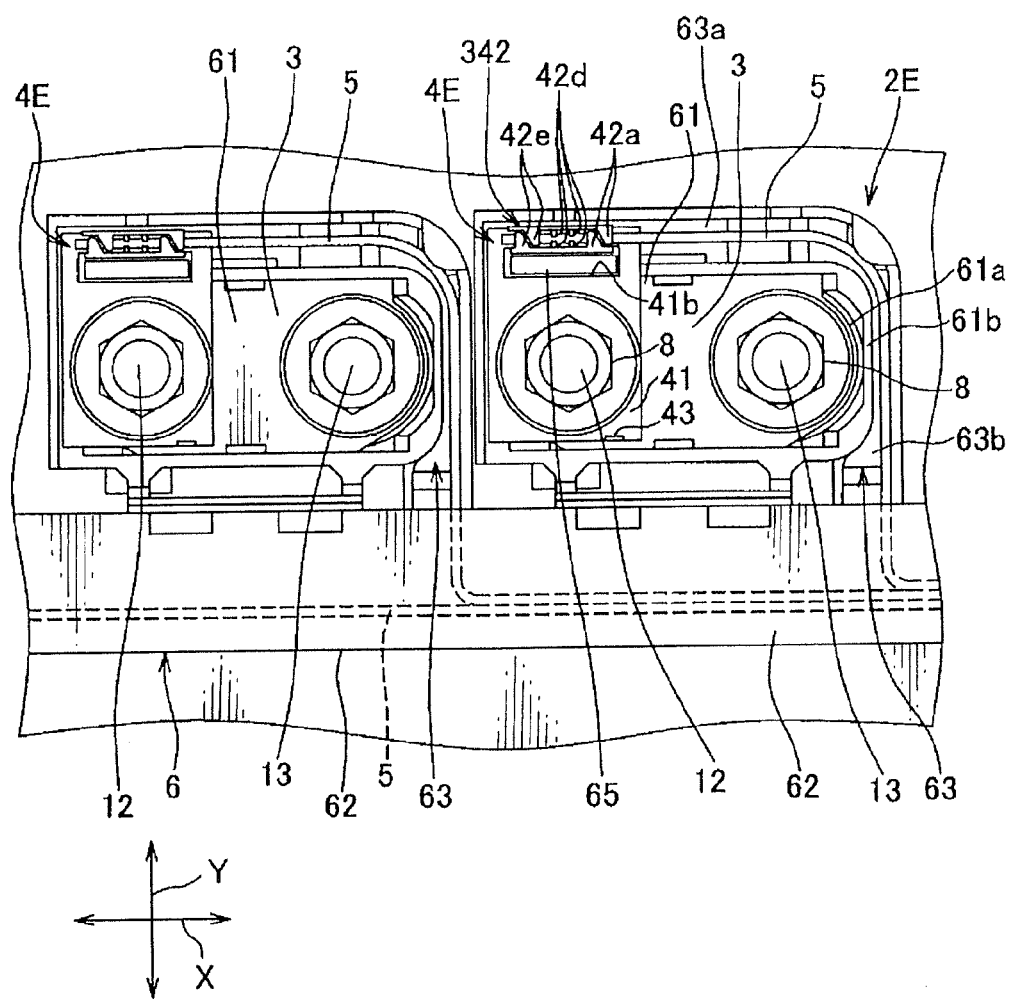
FIG. 14 is a plan view showing a part of the battery connecting structure according to fifth embodiment of the present invention.
Figure 15:
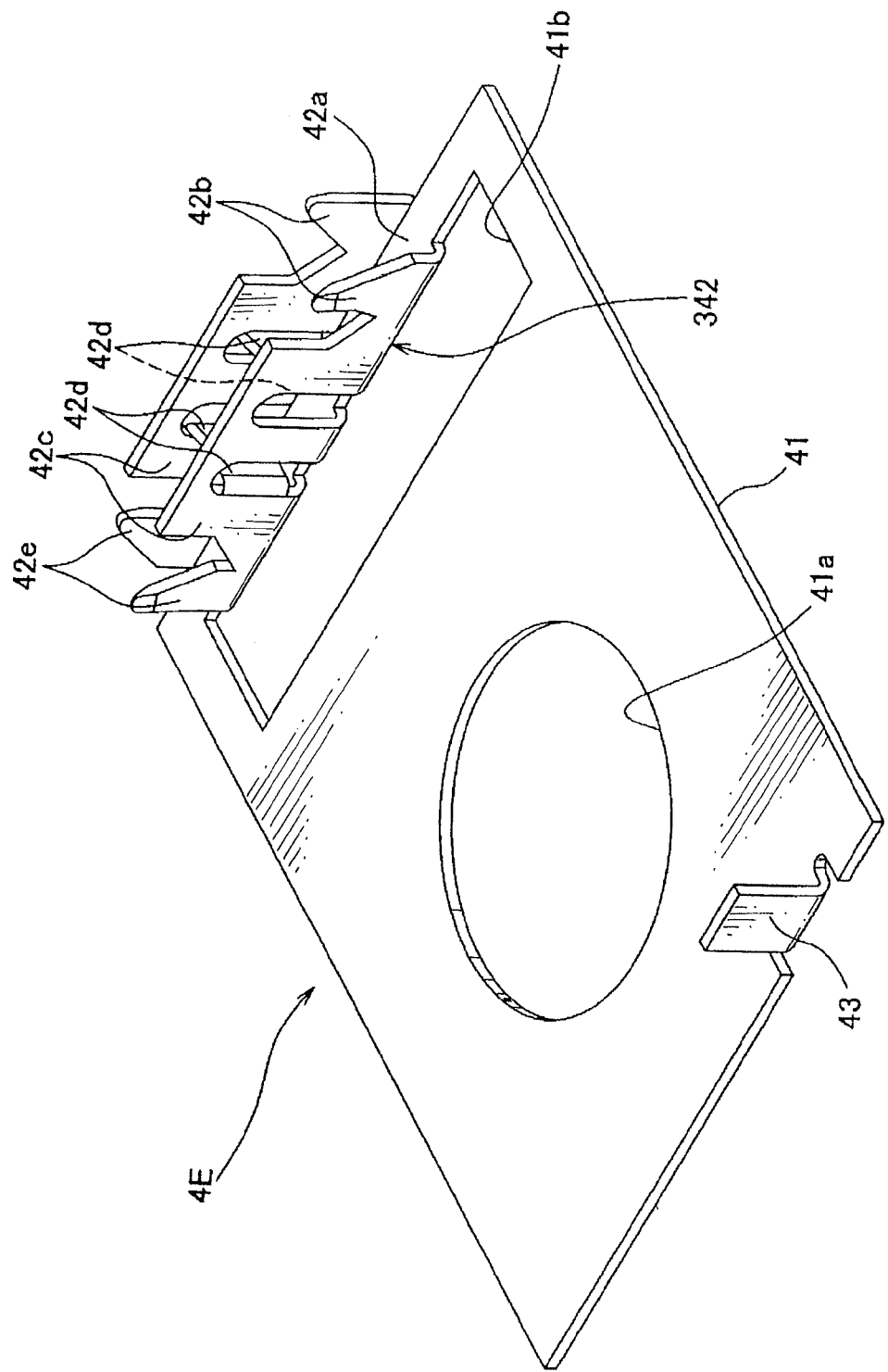
FIG. 15 is a plan view of a terminal shown in FIG. 14.
Figure 16:
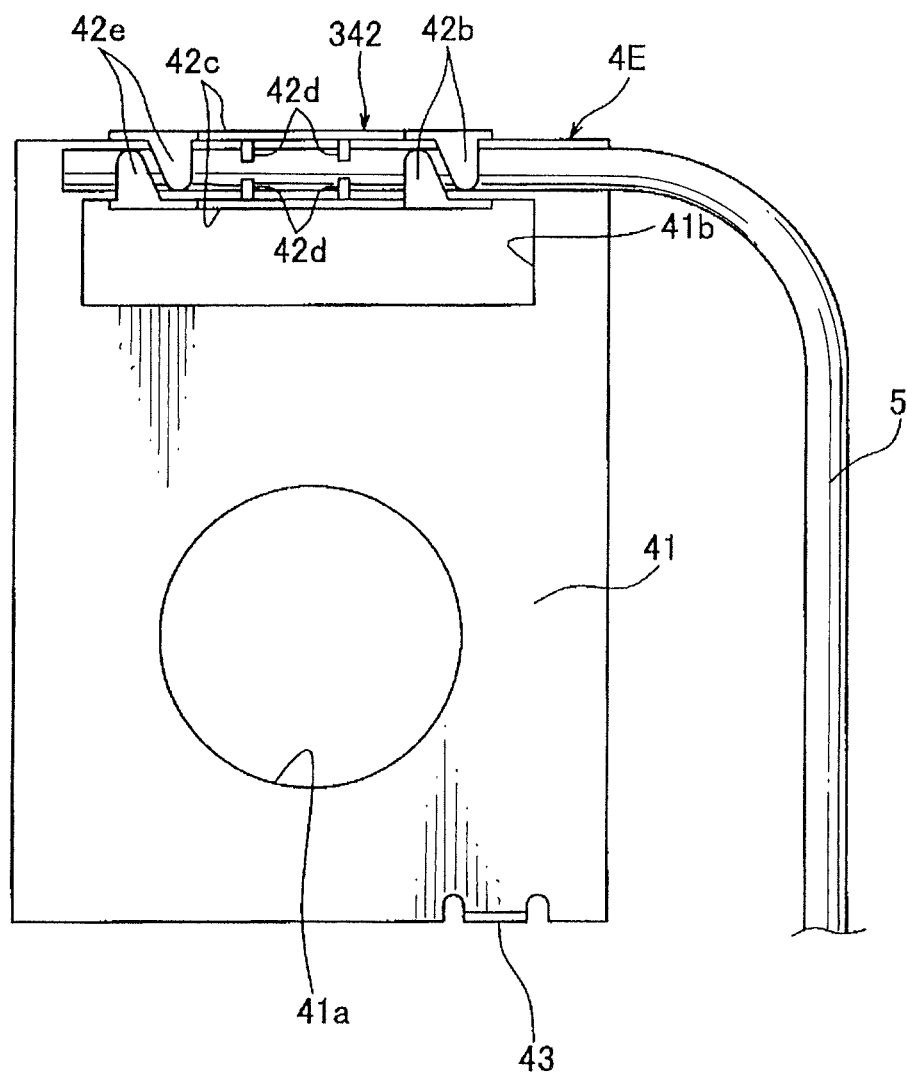
FIG. 16 is a plan view showing a condition that the electric wire is connected to the terminal shown in FIG. 14.
Figure 17:
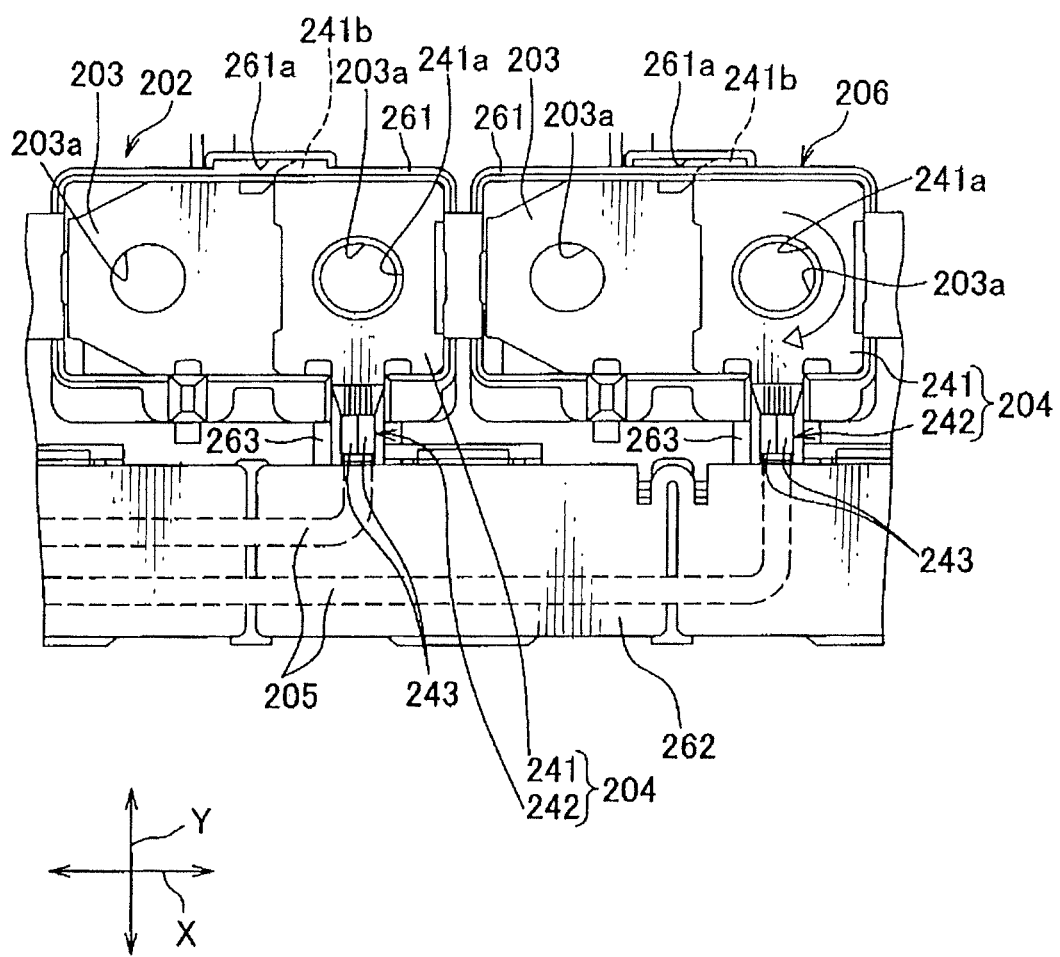
FIG. 17 is a plan view showing a part of a conventional battery connecting structure.

Next, the battery connecting structure according to the fifth embodiment of the present invention will be explained with reference to FIGS. 14-16. In FIGS. 14-16, components already described with reference to the first embodiment are denoted by the same reference numerals, and thus detailed description thereof will be hereinafter omitted.

As shown in FIG. 14, the supply device includes the battery connecting structure 2E of the present invention which is attached to one side surface of the battery assembly 1 shown in the first embodiment or the other side surface thereof.

The battery connecting structure 2E includes a plurality of bus bars 3, a plurality of terminals 4E overlapped with the bus bar 3 and connected thereto, a plurality of electric wires 5 connected to the terminal 4B respectively, and a plate 6 made of synthetic resin and receiving these.

The above terminal 4E, as shown in FIGS. 15 and 16, is constructed with the same as the terminal 4 (see FIG. 4) shown in the first embodiment except two pairs of crimping pieces 42b, 42e are arranged in the wire connecting portion 342.

That is, the wire connecting portion 342 of the terminal 4E includes a bottom plate 42a, a pair of crimping pieces 42b, a pair of crimping pieces 42e, a pair of side plates 42c, and two pairs of press-contact blades 42d. The bottom plate 42a continues to the bus bar connecting portion 41 and positions the electric wire 5 on the surface. The crimping pieces 42b (corresponding to "first crimping pieces" in claims) are vertically arranged from both ends of the bottom plate 42 in the width direction and crimp the electric wire 5. The crimping pieces 42e (corresponding to "second crimping pieces" in claims) are vertically arranged from both ends of the bottom plate 42 in the width direction, and are placed with a gap from the pair of crimping pieces 42b. Also, the crimping pieces 42e crimp the electric wire 5 therein. The side plates 42c are vertically arranged from both ends of the bottom plate 42a in the width direction, are placed between the pair of the crimping pieces 42b and the pair of the crimping pieces 42e, and position the electric wire 5 between the side plates 42c. The two pairs of press-contact blades 42d project from the side plate 42c toward the inside thereof.

That is, the two pairs of press-contact blades 42d are arranged between the pair of crimping pieces 42b and the pair of crimping pieces 42e. Further, the two pairs of press-contact blades 42d are respectively arranged in an opposite position. When the electric wire 5 is pressed between the press-contact blades 42d (namely, the electric wire 5 is positioned on the surface of the bottom plate 42a), the press-contact blades 42d penetrate the insulating cover of the electric wire 5 and are electrically connected to the core wire of the electric wire 5.

According to the battery connecting structure 2E having the above described construction of the present invention, the two pairs of the crimping pieces 42b, 42e which are located in both side of the pair of press-contact blades 42d are arranged in the wire connecting portion 342 of the terminal 4E. Thereby, connection between the electric wire 5 and the press-contact blades 42d can be prevented from separating. More specifically, the battery connecting structure 2E can prevent the electric wire 5 inserted into the press-contact blades 42d from being away from the bottom plate 42a.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A battery connecting structure comprising:
  a plurality of bus bars connecting a plurality of batteries in series by connecting a positive electrode and a negative electrode of the adjacent battery, said batteries overlapped with each other in a manner that the positive electrode and the negative electrode are arranged in the straight line alternately,
  a plurality of terminals respectively overlapped with each bus bar;
  a plurality of electric wires respectively connected with each terminal; and
  a plate for receiving the bus bars, the terminals, and the electric wires,
  wherein the plate includes a plurality of first receiving portions respectively receiving each bus bar and each terminal overlapped with the bus bar, and arranged along an arranging direction of the batteries; second receiving portion extended along an arranging direction of the first receiving portions, spaced in parallel to the first receiving portions, and receiving the electric wires which are connected to each terminal; and a plurality of third receiving portions communicating with an inside of each first receiving portion and an inside of the second receiving portion, and leading each electric wire connected to each tellninal from each first receiving portion to the second receiving portion respectively,
  wherein the terminal includes a plate-shaped bus bar connecting portion overlapped with the bus bar and a wire connecting portion connecting the electric wire,
  wherein the bus bar connecting portion and the wire connecting portion are received in the first receiving portion.

2. The battery connecting structure as claimed in claim 1, wherein the wire connecting portion is arranged above the positive and negative electrodes of the battery in a gravitational direction when the bus bars are connected to the batteries.

3. The battery connecting structure as claimed in claim 1, wherein the wire connecting portion is arranged in an end of the first receiving portion, said end located on a side away from the second receiving portion, wherein the third receiving portion communicates with the end of the first receiving portion, and communicates with the second receiving portion through a space between the first receiving portion and another first receiving portion adjacent to the first receiving portion.

4. The battery connecting structure as claimed in claim 1, wherein the first receiving portion is arranged above the second receiving portion and the third receiving portion in the gravitational direction when the bus bars are connected to the electric wires.

5. The battery connecting structure as claimed in claim 1, wherein the wire connecting portion includes at least a pair of press-contact blades which penetrate an insulating cover of the electric wire and connected to the core wire of the electric wire when the electric wire is pressed between press-contact blades.

6. The battery connecting structure as claimed in claim 1, wherein the bus bar connecting portion includes a terminal hole into which the positive electrode of the battery or the negative electrode thereof is inserted; and an opening into which a projection arranged in the plate is inserted for stopping rotation,
wherein the wire connecting portion includes a press-contact blade which is formed by cutting and standing a part of the bus bar connecting portion and is connected to a core wire of the electric wire by penetrating the insulating cover of the electric wire,
wherein the opening for stopping rotation is formed by cutting and standing the part of the bus bar connecting portion including the press-contact blade from the bus bar connecting portion.

7. The battery connecting structure as claimed in claim 1, wherein the bus bar connecting portion includes a terminal hole for inserting the positive electrode of the battery or the negative electrode thereinto,
wherein the wire connecting portion includes a bottom plate formed in a cantilever plate shape in which only one end of the bottom plate continues into the bus bar connecting portion and positioning the electric wire in a surface thereof; and a press-contact blade connected to the core wire of the electric wire by penetrating the insulating cover of the electric wire which is positioned on the surface of the bottom plate.

8. The battery connecting structure as claimed in claim 1, wherein the wire connecting portion includes a bottom plate continuing into the bus bar connecting portion and positioning the electric wire in the surface of the bottom plate; a pair of first crimping pieces vertically respectively arranged from both ends of the bottom plate in a width direction and crimping the electric wire; a pair of second crimping pieces vertically respectively arranged from the both end of the bottom plate in a width direction and spaced apart from the pair of first crimping pieces and crimping the electric wire; and a press-contact blade arranged between the pair of first crimping pieces and the pair of second crimping pieces and connected to the core wire of the electric wire by penetrating the insulating cover of the electric wire positioned on the surface of the bottom plate.

9. The battery connecting structure as claimed in claim 2, wherein the wire connecting portion is arranged in an end of the first receiving portion, said end located on a side away from the second receiving portion,
wherein the third receiving portion communicates with the end of the first receiving portion, and communicates with the second receiving portion through a space between the first receiving portion and another first receiving portion adjacent to the first receiving portion.

10. The battery connecting structure as claimed in claim 2, wherein the first receiving portion is arranged above the second receiving portion and the third receiving portion in the gravitational direction when the bus bars are connected to the electric wires.

11. The battery connecting structure as claimed in claim 2, wherein the wire connecting portion includes at least a pair of press-contact blades which penetrate an insulating cover of the electric wire and connected to the core wire of the electric wire when the electric wire is pressed between press-contact blades.

12. The battery connecting structure as claimed in claim 3, wherein the wire connecting portion includes at least a pair of press-contact blades which penetrate an insulating cover of the electric wire and connected to the core wire of the electric wire when the electric wire is pressed between press-contact blades.

13. The battery connecting structure as claimed in claim 4, wherein the wire connecting portion includes at least a pair of press-contact blades which penetrate an insulating cover of the electric wire and connected to the core wire of the electric wire when the electric wire is pressed between press-contact blades.

14. The battery connecting structure as claimed in claim 2, wherein the bus bar connecting portion includes a terminal hole into which the positive electrode of the battery or the negative electrode thereof is inserted; and an opening into which a projection arranged in the plate is inserted for stopping rotation,
wherein the wire connecting portion includes a press-contact blade which is formed by cutting and standing a part of the bus bar connecting portion and is connected to a core wire of the electric wire by penetrating the insulating cover of the electric wire,
wherein the opening for stopping rotation is formed by cutting and standing the part of the bus bar connecting portion including the press-contact blade from the bus bar connecting portion.

15. The battery connecting structure as claimed in claim 3, wherein the bus bar connecting portion includes a terminal hole into which the positive electrode of the battery or the negative electrode thereof is inserted; and an opening into which a projection arranged in the plate is inserted for stopping rotation,
wherein the wire connecting portion includes a press-contact blade which is formed by cutting and standing a part of the bus bar connecting portion and is connected to a core wire of the electric wire by penetrating the insulating cover of the electric wire,
wherein the opening for stopping rotation is formed by cutting and standing the part of the bus bar connecting portion including the press-contact blade from the bus bar connecting portion.

16. The battery connecting structure as claimed in claim 4, wherein the bus bar connecting portion includes a terminal hole into which the positive electrode of the battery or the negative electrode thereof is inserted; and an opening into which a projection arranged in the plate is inserted for stopping rotation,
wherein the wire connecting portion includes a press-contact blade which is formed by cutting and standing a part of the bus bar connecting portion and is connected to a core wire of the electric wire by penetrating the insulating cover of the electric wire, wherein the opening for stopping rotation is formed by cutting and standing the part of the bus bar connecting portion including the press-contact blade from the bus bar connecting portion.

17. The battery connecting structure as claimed in claim 2, wherein the bus bar connecting portion includes a terminal hole for inserting the positive electrode of the battery or the negative electrode thereinto,
wherein the wire connecting portion includes a bottom plate formed in a cantilever plate shape in which only one end of the bottom plate continues into the bus bar connecting portion and positioning the electric wire in a surface thereof; and a press-contact blade connected to the core wire of the electric wire by penetrating the insulating cover of the electric wire which is positioned on the surface of the bottom plate.

18. The battery connecting structure as claimed in claim 3, wherein the bus bar connecting portion includes a terminal hole for inserting the positive electrode of the battery or the negative electrode thereinto,
wherein the wire connecting portion includes a bottom plate formed in a cantilever plate shape in which only one end of the bottom plate continues into the bus bar connecting portion and positioning the electric wire in a surface thereof; and a press-contact blade connected to the core wire of the electric wire by penetrating the insulating cover of the electric wire which is positioned on the surface of the bottom plate.

19. The battery connecting structure as claimed in claim 2, wherein the wire connecting portion includes a bottom plate continuing into the bus bar connecting portion and positioning the electric wire in the surface of the bottom plate; a pair of first crimping pieces vertically respectively arranged from both ends of the bottom plate in a width direction and crimping the electric wire; a pair of second crimping pieces vertically respectively arranged from the both end of the bottom plate in a width direction and spaced apart from the pair of first crimping pieces and crimping the electric wire; and a press-contact blade arranged between the pair of first crimping pieces and the pair of second crimping pieces and connected to the core wire of the electric wire by penetrating the insulating cover of the electric wire positioned on the surface of the bottom plate.

20. The battery connecting structure as claimed in claim 3, wherein the wire connecting portion includes a bottom plate continuing into the bus bar connecting portion and positioning the electric wire in the surface of the bottom plate; a pair of first crimping pieces vertically respectively arranged from both ends of the bottom plate in a width direction and crimping the electric wire; a pair of second crimping pieces vertically respectively arranged from the both end of the bottom plate in a width direction and spaced apart from the pair of first crimping pieces and crimping the electric wire; and a press-contact blade arranged between the pair of first crimping pieces and the pair of second crimping pieces and connected to the core wire of the electric wire by penetrating the insulating cover of the electric wire positioned on the surface of the bottom plate.

* * * * *